United States Patent
Wan et al.

(10) Patent No.: US 11,836,284 B2
(45) Date of Patent: *Dec. 5, 2023

(54) SENSOR FUSION FOR ELECTROMAGNETIC TRACKING

(71) Applicant: Magic Leap, Inc., Plantation, FL (US)

(72) Inventors: Sheng Wan, San Jose, CA (US); Michael Janusz Woods, Mountain View, CA (US)

(73) Assignee: MAGIC LEAP, INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/060,918

(22) Filed: Dec. 1, 2022

(65) Prior Publication Data

US 2023/0100979 A1    Mar. 30, 2023

Related U.S. Application Data

(63) Continuation of application No. 17/733,729, filed on Apr. 29, 2022, now Pat. No. 11,550,156, which is a
(Continued)

(51) Int. Cl.
*G06F 3/01* (2006.01)
*G02B 27/01* (2006.01)
(Continued)

(52) U.S. Cl.
CPC .............. *G06F 3/011* (2013.01); *G01B 7/004* (2013.01); *G02B 27/0172* (2013.01);
(Continued)

(58) Field of Classification Search
None
See application file for complete search history.

(56) References Cited

U.S. PATENT DOCUMENTS

| 3,868,565 A | 2/1975 | Kuipers |
| 6,172,499 B1 | 1/2001 | Ashe |
| (Continued) | | |

FOREIGN PATENT DOCUMENTS

WO    WO 2020/0214272    10/2020

OTHER PUBLICATIONS

International Search Report and Written Opinion for PCT Application No. PCT/US2020/021415, dated May 27, 2020.
(Continued)

*Primary Examiner* — Christopher J Kohlman
(74) *Attorney, Agent, or Firm* — SEED IP LAW GROUP LLP

(57) ABSTRACT

Head-mounted augmented reality (AR) devices can track pose of a wearer's head or pose of a hand-held user input device to enable wearer interaction in a three-dimensional AR environment. A pose sensor (e.g., an inertial measurement unit) in the user input device can provide data on pose (e.g., position or orientation) of the user input device. An electromagnetic (EM) tracking system can also provide pose data. For example, the handheld user input device can include an EM emitter that generates an EM field, and the head-mounted AR device can include an EM sensor that senses the EM field. The AR device can combine the output of the pose sensor and the EM tracking system to reduce drift in the estimated pose of the user input device or to transform the pose into a world coordinate system used by the AR device. The AR device can utilize a Kalman filter to combine the output of the pose sensor and the EM tracking system.

9 Claims, 22 Drawing Sheets

Related U.S. Application Data continuation of application No. 17/237,879, filed on Apr. 22, 2021, now Pat. No. 11,353,709, which is a continuation of application No. 16/811,584, filed on Mar. 6, 2020, now Pat. No. 11,016,305.

(60) Provisional application No. 62/834,081, filed on Apr. 15, 2019.

(51) Int. Cl.

| | | |
|---|---|---|
| *G01B 7/004* | (2006.01) | |
| *G06T 7/277* | (2017.01) | |
| *G06T 7/73* | (2017.01) | |
| *G06T 19/00* | (2011.01) | |
| *G06F 3/0346* | (2013.01) | |
| *G06F 18/25* | (2023.01) | |

(52) U.S. Cl.
CPC ....... *G02B 27/0179* (2013.01); *G06F 3/0346* (2013.01); *G06F 18/25* (2023.01); *G06T 7/277* (2017.01); *G06T 7/74* (2017.01); *G06T 19/006* (2013.01); *G02B 2027/0187* (2013.01); *G06T 2207/30244* (2013.01)

(56) References Cited

U.S. PATENT DOCUMENTS

| | | | |
|---|---|---|---|
| 6,754,596 | B2 | 6/2004 | Ashe |
| 6,774,624 | B2 | 8/2004 | Anderson et al. |
| 6,850,221 | B1 | 2/2005 | Tickle |
| 7,542,869 | B2 | 6/2009 | Gandelsman et al. |
| 8,571,636 | B2 | 10/2013 | Wu |
| 8,700,376 | B2 | 4/2014 | Ophir et al. |
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 11,016,305 | B2 | 5/2021 | Wan et al. |
| 11,353,709 | B2 | 6/2022 | Wan et al. |
| 2002/0030483 | A1 | 3/2002 | Gilboa |
| 2006/0028436 | A1 | 2/2006 | Armstrong |
| 2007/0081123 | A1 | 4/2007 | Lewis |
| 2008/0125997 | A1 | 5/2008 | Li et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0085429 | A1 | 3/2014 | Hebert et al. |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0041625 | A1 | 2/2016 | Maizels et al. |
| 2016/0259404 | A1 | 9/2016 | Woods |
| 2017/0205903 | A1* | 7/2017 | Miller .................... G06T 7/174 |
| 2017/0307891 | A1 | 10/2017 | Bucknor et al. |
| 2018/0075659 | A1 | 3/2018 | Browy et al. |
| 2018/0108179 | A1 | 4/2018 | Tomlin et al. |
| 2018/0239144 | A1 | 8/2018 | Woods et al. |
| 2018/0300897 | A1 | 10/2018 | Woods et al. |
| 2019/0380791 | A1* | 12/2019 | Fuerst .................. G06F 3/0346 |
| 2020/0326544 | A1 | 10/2020 | Wan et al. |
| 2021/0239993 | A1 | 8/2021 | Wan et al. |
| 2022/0260839 | A1 | 8/2022 | Wan |

OTHER PUBLICATIONS

International Preliminary Report on Patentability for PCT Application No. PCT/US2020/021415, dated Sep. 28, 2021.

ARToolKit: https://web.archive.org/web/20051013062315/http://www.hiti.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Gade, K., (2009): Introduction to Inertial Navigation and Kalman Filtering. Tutorial for IAIN World Congress, Stockholm, Sweden, Oct. 2009.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Raab, F., et al. "Magnetic Position and Orientation Tracking System," IEEE Transactions on Aerospace and Electronic Systems, vol. AES-15, No. 5, Sep. 1979.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

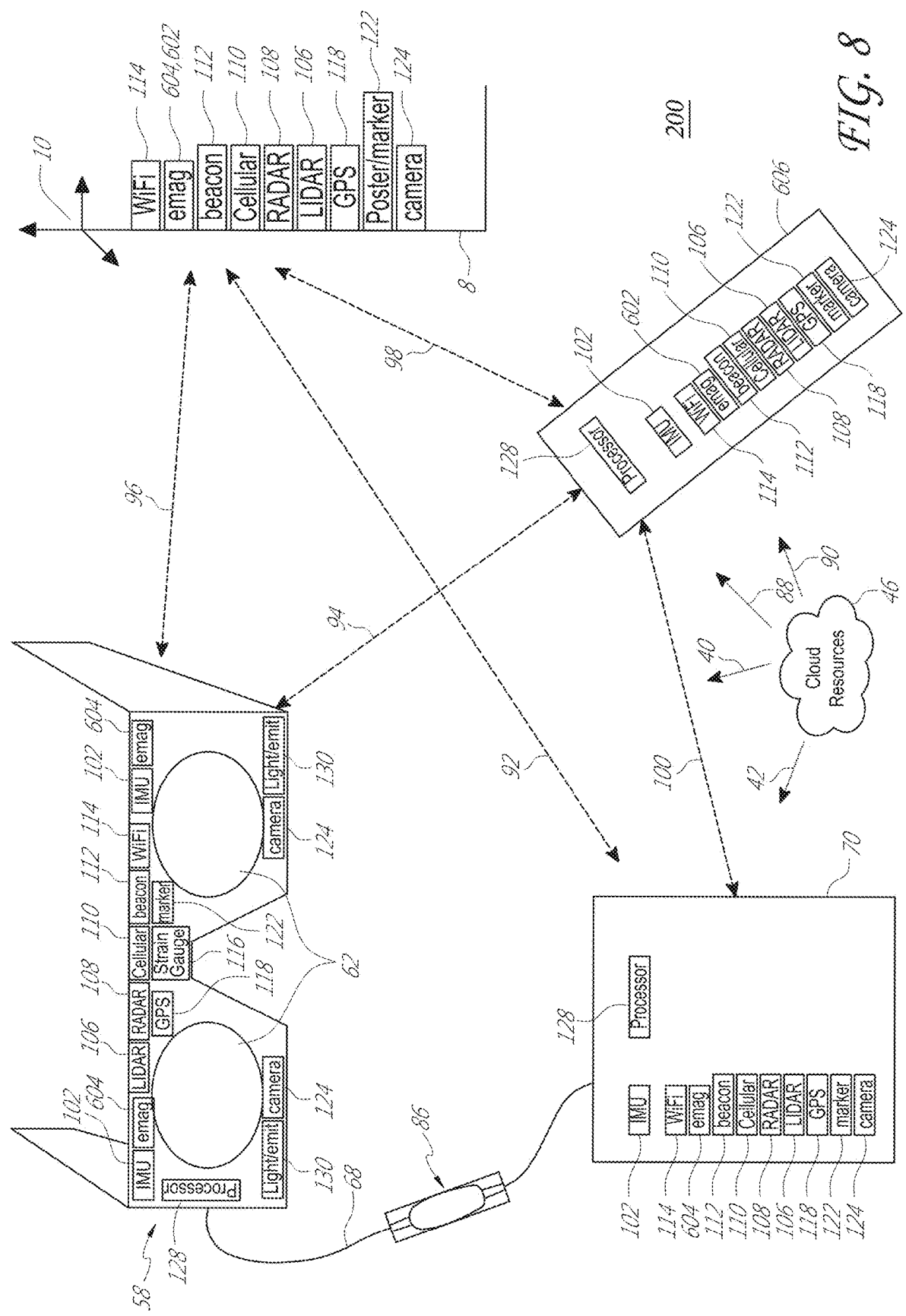

SENSOR FUSION FOR ELECTROMAGNETIC TRACKING

PRIORITY CLAIM

This application is a continuation application of U.S. application Ser. No. 17/733,729, filed Apr. 29, 2022, entitled "SENSOR FUSION FOR ELECTROMAGNETIC TRACKING", which is a continuation application of U.S. application Ser. No. 17/237,879, filed Apr. 22, 2021, entitled "SENSOR FUSION FOR ELECTROMAGNETIC TRACKING", which is a continuation application of U.S. application Ser. No. 16/811,584, filed Mar. 6, 2020, entitled "SENSOR FUSION FOR ELECTROMAGNETIC TRACKING", which claims benefit of priority of U.S. Provisional Application No. 62/834,081, filed on Apr. 15, 2019, which is incorporated herein by reference

BACKGROUND

Field

The present disclosure relates generally to systems and methods to determine position or orientation of an object and more particularly to fusing electromagnetic tracking techniques with other sensor inputs.

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

SUMMARY

Head-mounted augmented reality (AR) devices can track the pose of the wearer's head (or other body part) to be able to provide a three-dimensional virtual representation of objects in the wearer's environment. Embodiments of an electromagnetic (EM) tracking system can be used to track head pose or body gestures. For example, a handheld user input device can include an EM emitter and the head-mounted AR device can include an EM sensor. In some implementations, the EM emitter generates an EM field that can be sensed by the EM sensor. EM information from the sensor can be analyzed to determine location and/or orientation of the sensor and thereby the wearer's head pose in a reference frame of the AR device. The pose can be a six degree-of-freedom (6DOF) pose including three spatial coordinates and three angular coordinates in the reference frame of the AR device. The reference frame of the AR device may be a global (or world) coordinate system, representative of fixed objects in the real world environment of the wearer.

The AR device can include other sensors that provide pose information, for example, an accelerometer, a gyroscope, a magnetometer, optical sensors or cameras, etc. As an example, accelerometer data can be integrated twice to provide an estimated position. However, errors in the sensor signal can cause the estimated position to drift relative to the actual position. Also, the position or orientation inferred from the sensor may be in a frame of reference associated with the sensor rather than the reference frame of the AR device (e.g., the world coordinate system).

Examples of techniques for fusing outputs from an electromagnetic tracking system and another sensor modality (e.g., accelerometer, gyroscope, magnetometer) to reduce pose error or to transform pose to the reference frame of the AR device are described herein. A Kalman filter or other type of data fusion technique can be used to fuse the outputs.

The sensor fusion techniques are not limited to AR or VR applications and in other implementations can be applied to pose determination of any object where sensors of different modalities (e.g., an accelerometer and an EM tracking device) are used. For example, the sensor fusion techniques can be applied to tracking medical devices and instruments in an operating room.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 8 schematically illustrates examples of components of an embodiment of an AR system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview of AR, VR and Localization Systems

Figure 1:
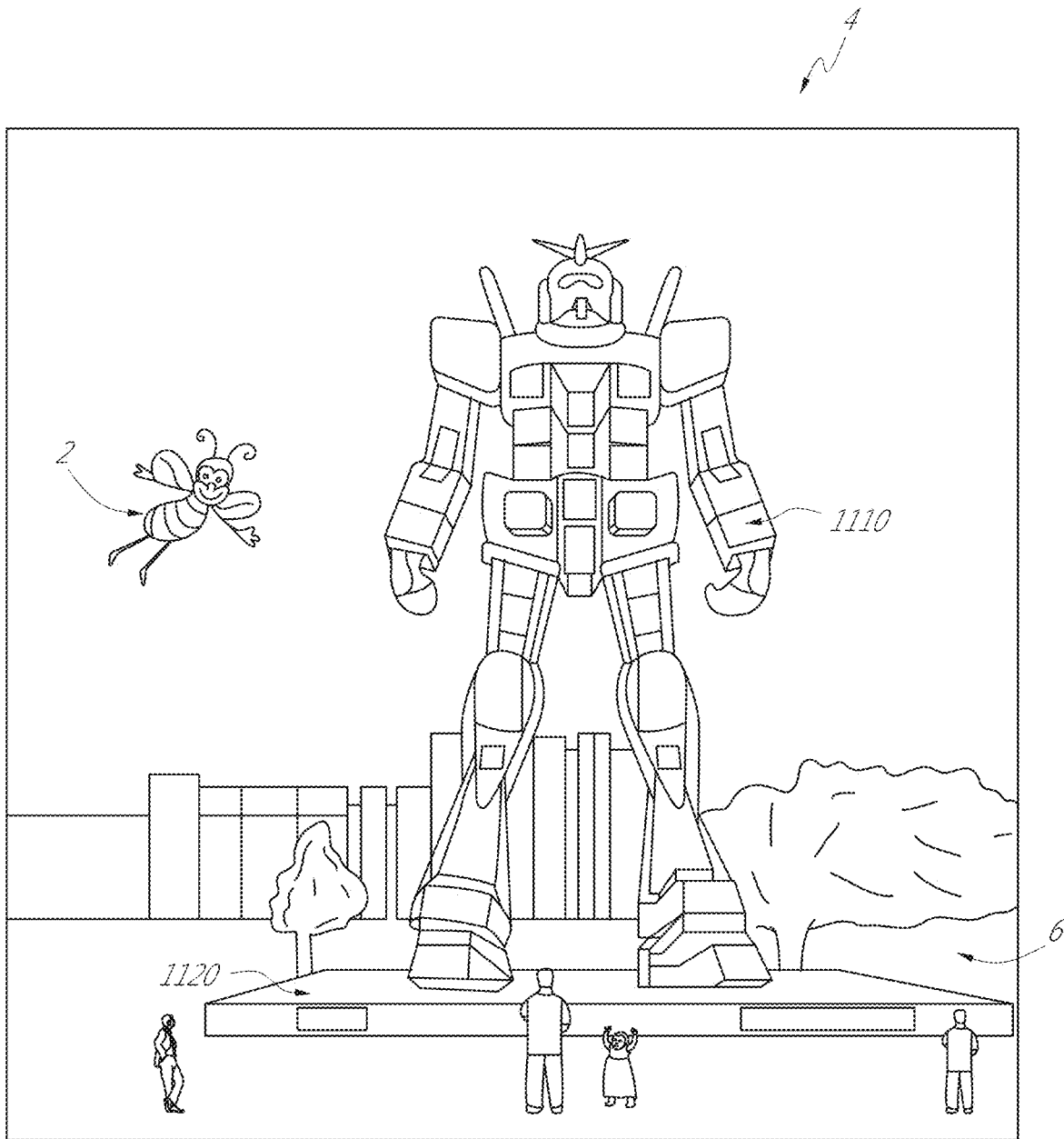
FIG. 1 depicts an illustration of an augmented reality scenario with certain virtual reality objects, and certain physical objects viewed by a person.

In FIG. 1 an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user. In addition, detection of the position and/or orientation of a real object, such as a handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (e.g., the elapsed time between when the user moves his or her head and the time when the image gets updated and displayed to the user) have been challenges for VR and AR systems. Especially for display systems that fill a substantial portion of the user's visual field with virtual elements, it is advantageous if the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In some embodiments, a first user may be provided with a totem (e.g., a real bat communicatively coupled to the AR system) to hit the virtual ball. In some embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, but are difficult to achieve. In other words, the AR system can recognize a physical location of a real object (e.g., user's head, totem, haptic device, wearable component, user's hand, etc.) and correlate the physical coordinates of the real object to virtual coordinates corresponding to one or more virtual objects being displayed to the user. This generally requires highly accurate sensors and sensor recognition systems that track a position and orientation of one or more objects at rapid rates. Current approaches do not perform localization at satisfactory speed or precision standards.

Thus, there is a need for a better localization system in the context of AR and VR devices.

Example AR and VR Systems and Components

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
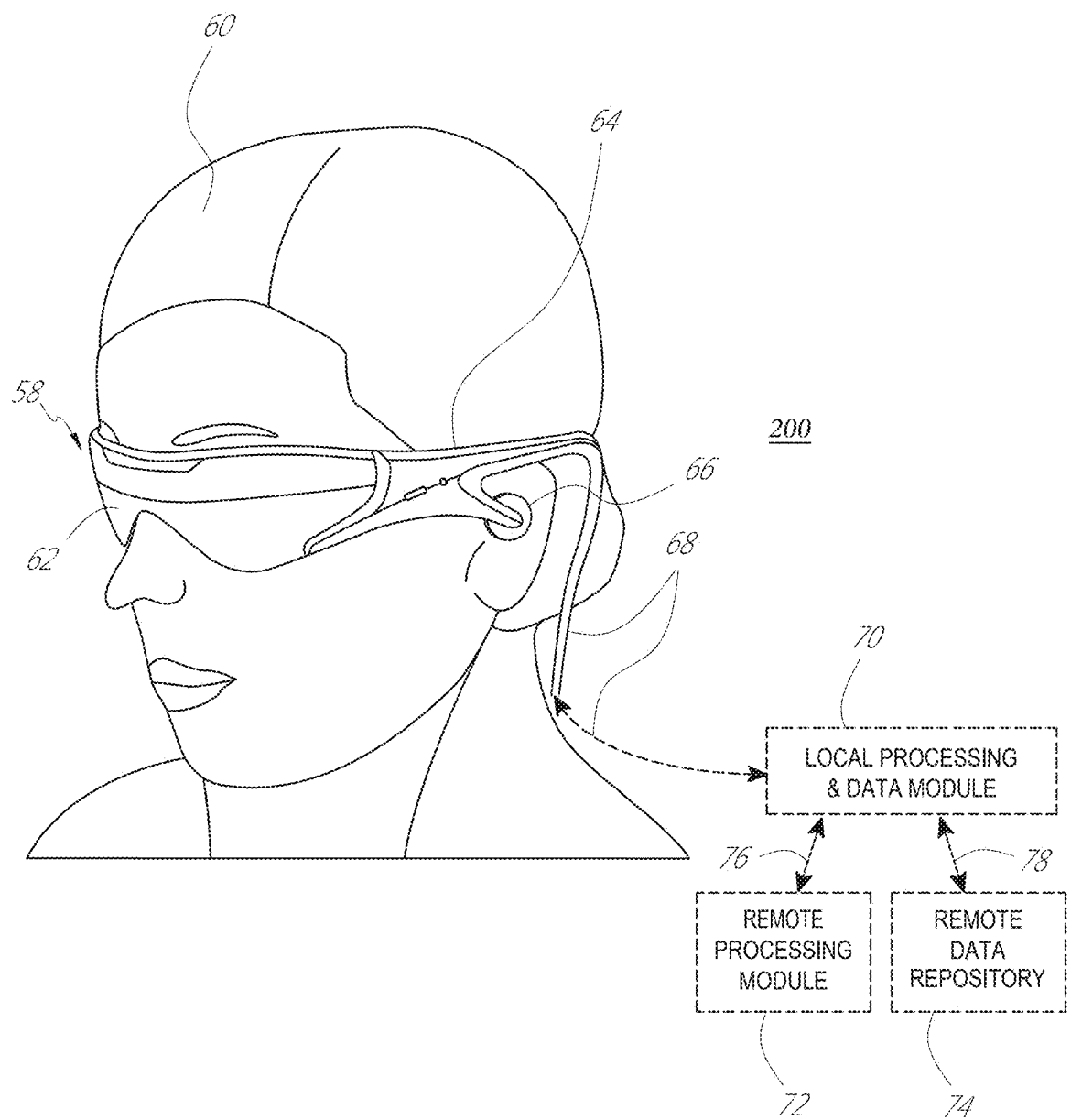
FIGS. 2A-2D schematically illustrate examples of a wearable system.
Figure 2B:
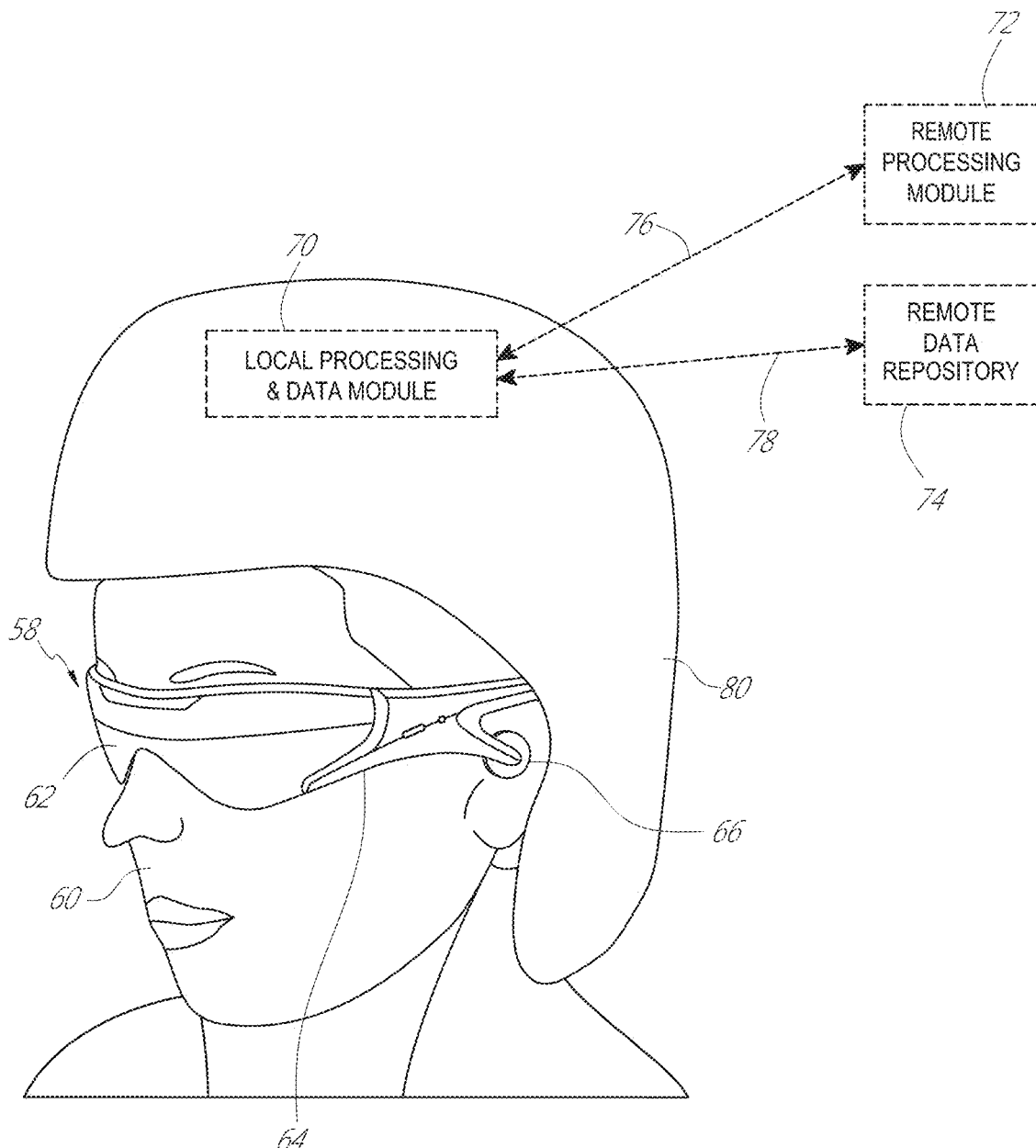
Figure 2C:
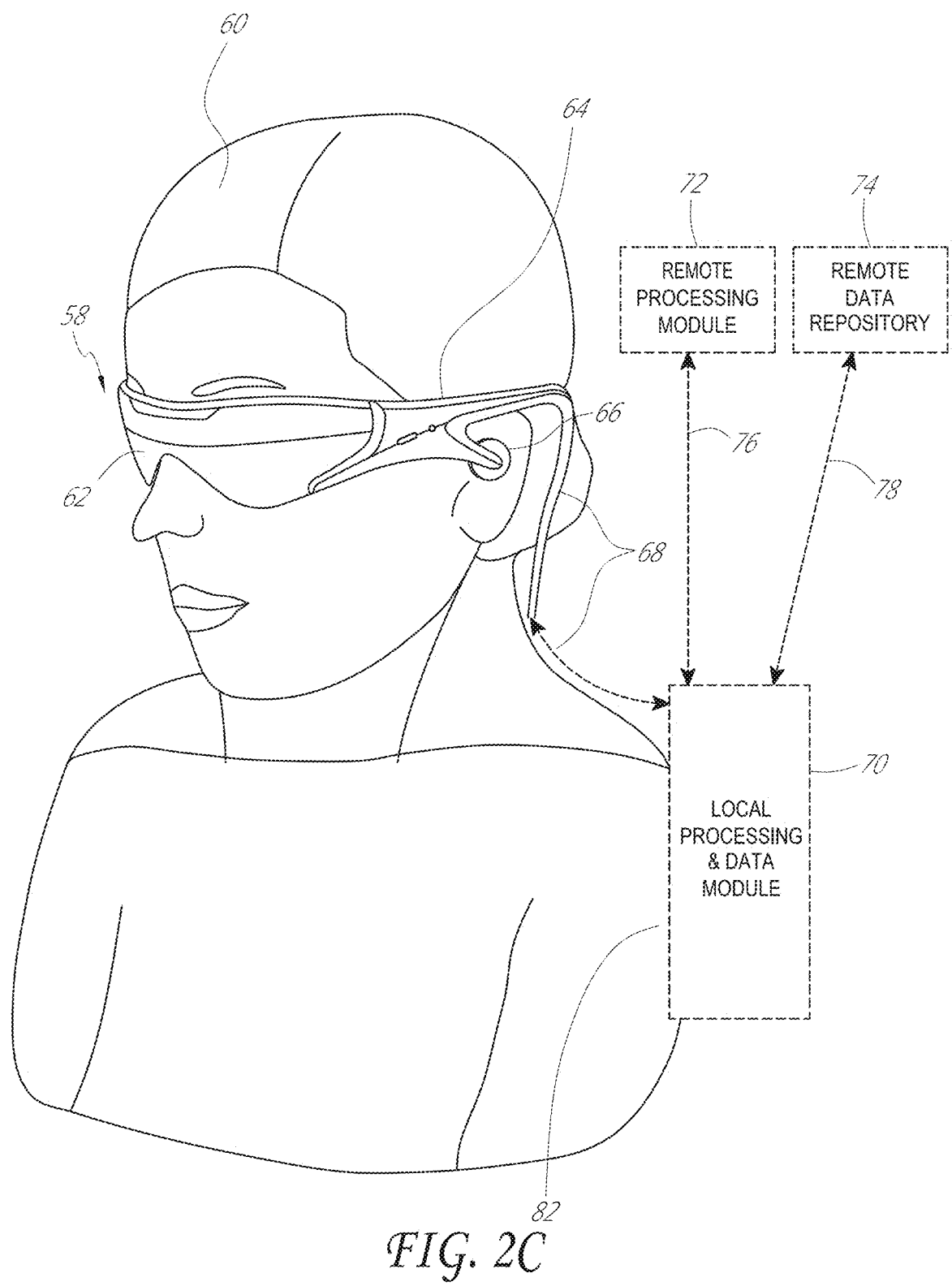
Figure 2D:
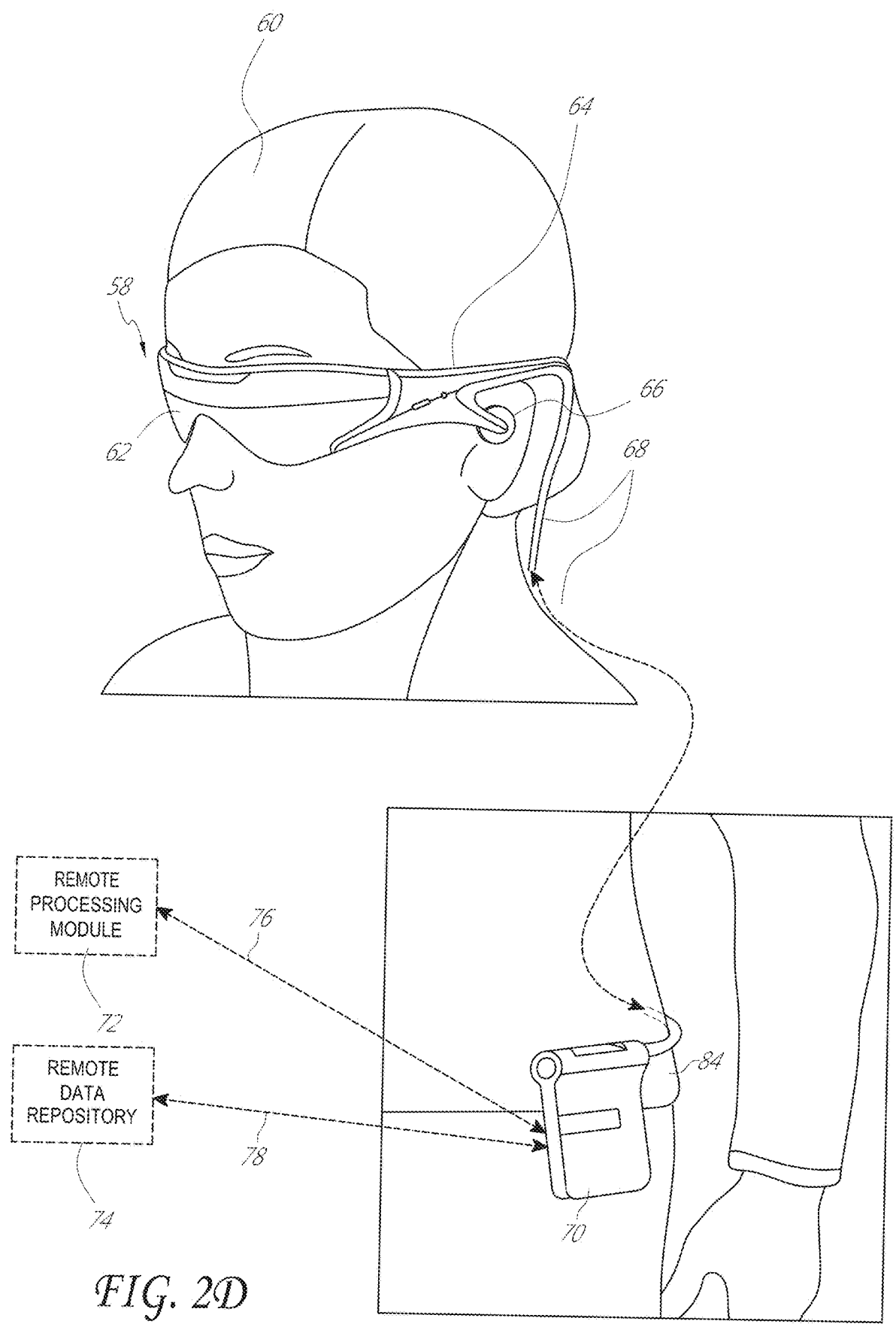

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may include a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units (which may include an accelerometer and a gyroscope or a magnetometer), accelerometers, compasses, gyroscopes, magnetometers, or GPS units, radio devices; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may include one or more relatively powerful processors or controllers configured to analyze and process data and/or image information. In one embodiment, the remote data repository (74) may include a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
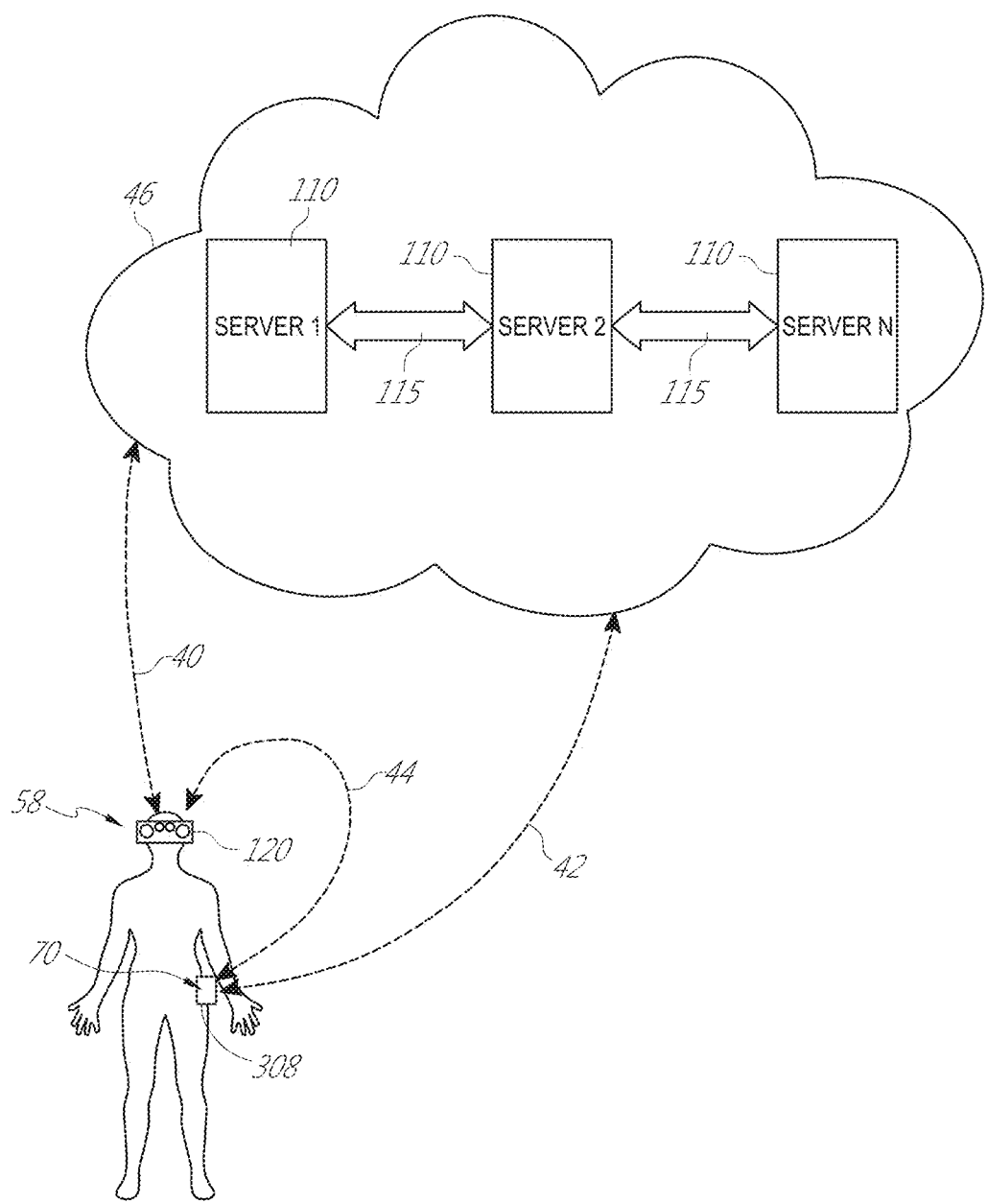
FIG. 3 schematically illustrates coordination between cloud computing assets and local processing assets.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database including raster imagery, 3-D and 2-D points, parametric information and other information about the real world. As more and more AR users continually capture information about their real environment (e.g., through cameras, sensors, IMUs, etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (e.g., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

Three-dimensional (3-D) points may be captured from the environment, and the pose (e.g., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (e.g., cache the tagged images); so the cloud may have on the ready (e.g., in available cache) tagged 2-D images (e.g., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. Patent Pub. No. 2014/0306866, entitled "System and method for augmented and virtual reality", which is incorporated by reference in its entirety herein, along with the following additional disclosures, which related to augmented and virtual reality systems such as those developed by Magic Leap, Inc. of Plantation, Florida: U.S. Patent Pub. No. 2015/0178939; U.S. Patent Pub. No. 2015/0205126; U.S. Patent Pub. No. 2014/0267420; U.S. Patent Pub. No. 2015/0302652; U.S. Patent Pub. No. 2013/0117377; and U.S. Patent Pub. No. 2013/0128230, each of which is hereby incorporated by reference herein in its entirety.

GPS and other localization information may be utilized as inputs to such processing. Highly accurate localization of the user's head, totems, hand gestures, haptic devices etc. may be advantageous in order to display appropriate virtual content to the user.

The head-mounted device (58) may include displays positionable in front of the eyes of the wearer of the device. The displays may include light field displays. The displays may be configured to present images to the wearer at a plurality of depth planes. The displays may include planar waveguides with diffraction elements. Examples of displays, head-mounted devices, and other AR components usable with any of the embodiments disclosed herein are described in U.S. Patent Publication No. 2015/0016777. U.S. Patent Publication No. 2015/0016777 is hereby incorporated by reference herein in its entirety.

Examples of Electromagnetic Localization

One approach to achieve high precision localization may involve the use of an electromagnetic (EM) field coupled with EM sensors that are strategically placed on the user's AR head set, belt pack, and/or other ancillary devices (e.g., totems, haptic devices, gaming instruments, etc.). EM tracking systems typically include at least an EM field emitter (sometimes referred to as a transmitter or emitter generally) and at least one EM field sensor (sometimes referred to as a receiver or sensor generally). The EM emitter generates an EM field having a known spatial (and/or temporal) distribution in the environment of wearer of the AR headset. The EM field sensors measure the generated EM fields at the locations of the sensors. Based on these measurements and knowledge of the distribution of the generated EM field, a pose (e.g., a position and/or orientation) of a field sensor relative to the emitter may be determined. Accordingly, the pose of an object to which the sensor is attached may be determined.

EM tracking may be a promising approach for localization and tracking of objects in multiple domains, including applications in AR, VR, medicine, sports, manufacturing and gaming. A possible advantage of EM localization over some other methods using optical imaging techniques is that EM tracking can localize objects in the presence of occlusions (e.g., where a first object is in front of a second object and at least partially blocks the second object from view of an imaging system). EM tracking can also offer good dynamic response time, and may not require performance of complex image processing and computer vision techniques sometimes implemented with camera methods. Camera-based tracking systems may require dedicated algorithms and hardware for their high computational workload and may also lack robustness against fast motion dynamics and occlusions. In AR and VR applications, the processor (e.g., the local processing and data module 70) performs many computationally-intensive tasks (e.g., rendering virtual content to the user as described with reference to FIG. 1), as well as performing many of these tasks in real time. Therefore, reducing the computational complexity of tasks performed by the processor may be advantageous in AR and VR applications, and the usage of EM tracking systems can also be advantageous in offloading tasks from the processor.

Figure 4:
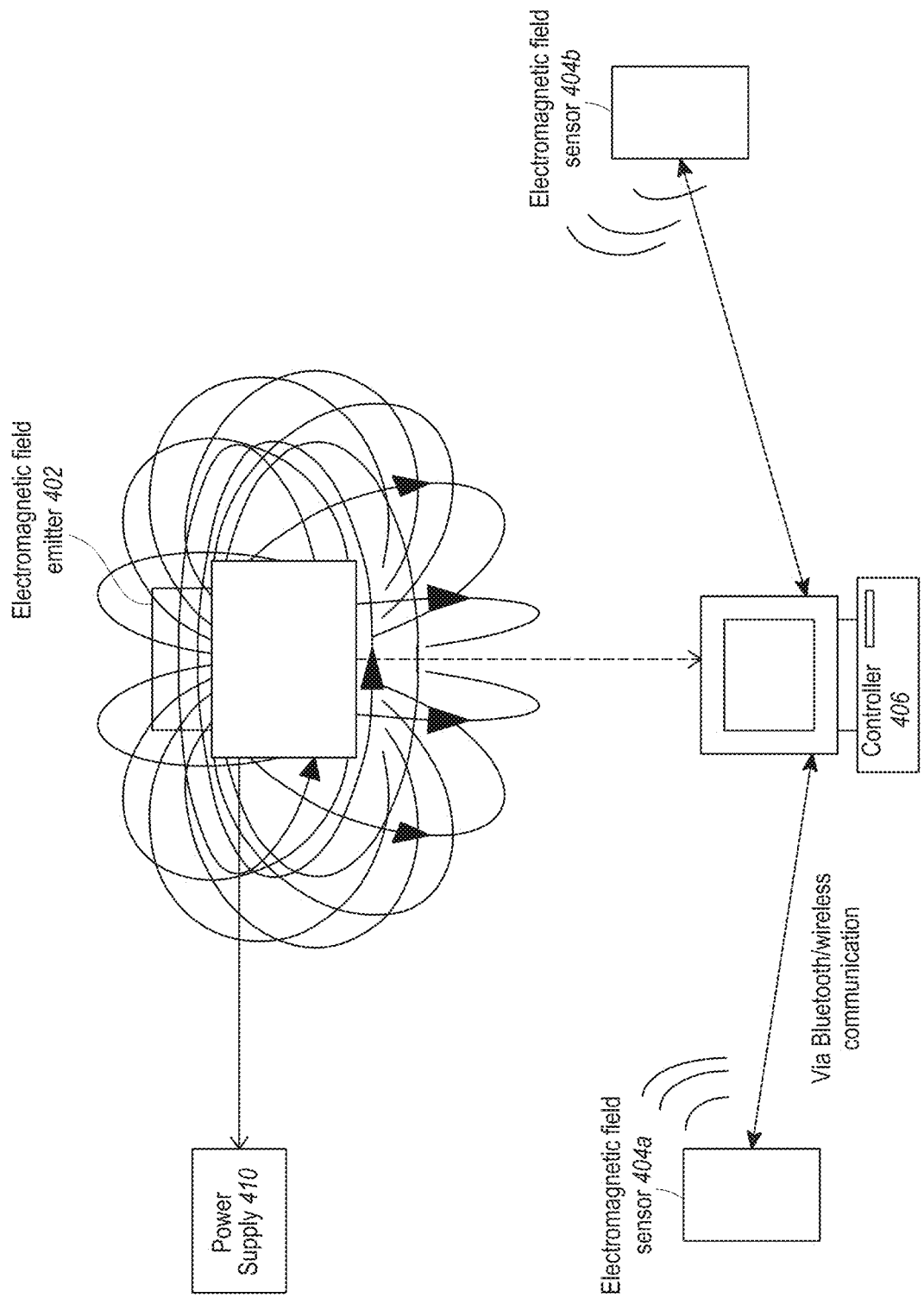
FIG. 4 schematically illustrates an example system diagram of an electromagnetic (EM) tracking system.

Referring now to FIG. 4, an example system diagram of an EM tracking system (e.g., such as those developed by organizations such as the Biosense division of Johnson & Johnson Corporation, Polhemus, Inc. of Colchester, Vermont, manufactured by Sixense Entertainment, Inc. of Los Gatos, California, and other tracking companies) is illustrated. In one or more embodiments, the EM tracking system includes an EM emitter 402 (which sometimes may be referred to as an EM field emitter or simply an emitter), which is configured to emit a known magnetic field. As shown in FIG. 4, the EM emitter may be coupled to a power supply (e.g., electric current, batteries, etc.) to provide power to the emitter 402.

In one or more embodiments, the EM emitter 402 includes several coils (e.g., at least three coils positioned perpendicular to each other to produce field in the X, Y and Z directions) that generate magnetic fields. This magnetic field is used to establish a coordinate space (e.g., an X-Y-Z Cartesian coordinate space). This allows the system to map a position of the sensors (e.g., an (X,Y,Z) position) in relation to the known magnetic field, and helps determine a position and/or orientation of the sensors. In one or more embodiments, the EM sensors 404a, 404b, etc. may be attached to one or more real objects. The EM sensors 404 (which sometimes may be referred to as EM field sensors or simply sensors) may include smaller coils in which current may be induced through the emitted EM field. Generally the "sensor" components (404) may include small coils or loops, such as a set of three differently-oriented (e.g., such as orthogonally oriented relative to each other) coils coupled together within a small structure such as a cube or other container, that are positioned/oriented to capture incoming magnetic flux from the magnetic field emitted by the emitter (402), and by comparing currents induced through these coils, and knowing the relative positioning and orientation of the coils relative to each other, relative position and orientation of a sensor relative to the emitter may be calculated.

Figure 6:
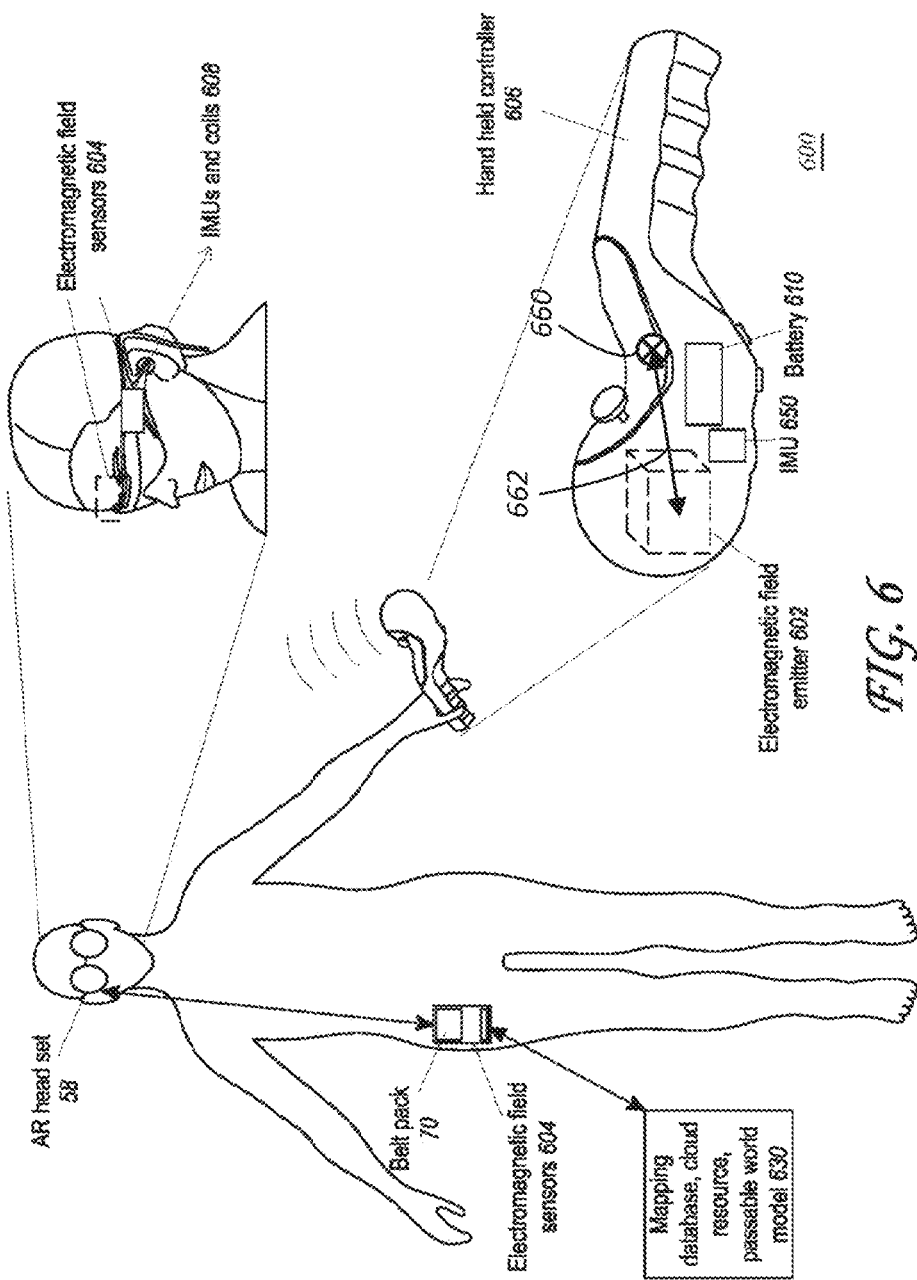
FIG. 6 schematically illustrates an example of an EM tracking system incorporated with an AR system.

One or more parameters pertaining to a behavior of the coils and inertial measurement unit ("IMU") components operatively coupled to the EM tracking sensors may be measured to detect a position and/or orientation of the sensor (and the object to which it is attached to) relative to a coordinate system to which the EM emitter is coupled. In one or more embodiments, multiple sensors may be used in relation to the EM emitter to detect a position and orientation of each of the sensors within the coordinate space. The EM tracking system may provide positions in three directions (e.g., X, Y and Z directions), and further in two or three orientation angles (e.g., yaw, pitch, and roll). For example, the EM tracking system may determine a six degree-of-freedom (6DOF) pose including three spatial coordinates (e.g., X, Y, and Z) and three orientation angles (e.g., yaw, pitch, and roll). In one or more embodiments, measurements of the IMU may be compared to the measurements of the coil to determine a position and orientation of the sensors. In one or more embodiments, both EM data and IMU data, along with various other sources of data, such as cameras, depth sensors, and other sensors, may be combined to determine the position and orientation. This information may be transmitted (e.g., wireless communication, Bluetooth, etc.) to the controller 406. In one or more embodiments, pose (or position and orientation) may be reported at a relatively high refresh rate in conventional systems. Conventionally an EM emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 6, various features of the EM tracking system may be employed to produce a configuration wherein changes or deltas in position and/or orientation between two objects that move in space relative to a more stable global coordinate system may be tracked; in other words, a configuration is shown in FIG. 6 wherein a variation of an EM tracking system may be utilized to track position and orientation delta between a head-mounted component and a hand-held component, while head pose relative to the global coordinate system (say of the room environment local to the user) is determined otherwise, such as by simultaneous localization and mapping ("SLAM") techniques using outward-capturing cameras which may be coupled to the head mounted component of the system.

The controller 406 may control the EM field generator 402, and may also capture data from the various EM sensors 404. It should be appreciated that the various components of the system may be coupled to each other through any electro-mechanical or wireless/Bluetooth means. The controller 406 may also include data regarding the known magnetic field, and the coordinate space in relation to the magnetic field. This information is then used to detect the position and orientation of the sensors in relation to the coordinate space corresponding to the known EM field.

One advantage of EM tracking systems is that they produce highly accurate tracking results with minimal latency and high resolution. Additionally, the EM tracking system does not necessarily rely on optical trackers, and sensors/objects not in the user's line-of-vision may be easily tracked.

It should be appreciated that the strength of the EM field drops as a cubic function of distance r from a coil transmitter (e.g., EM emitter 402). Thus, an algorithm may be used based on a distance away from the EM emitter. The controller 406 may be configured with such algorithms to determine a position and orientation (e.g., a 6DOF pose) of the sensor/object at varying distances away from the EM emitter. Given the rapid decline of the strength of the EM field as the sensor moves farther away from the EM emitter, best results, in terms of accuracy, efficiency and low latency, may be achieved at closer distances. In typical EM tracking systems, the EM emitter is powered by electric current (e.g., plug-in power supply) and has sensors located within 20 ft radius away from the EM emitter. A shorter radius between the sensors and emitter may be more desirable in many applications, including AR applications.

Figure 5:
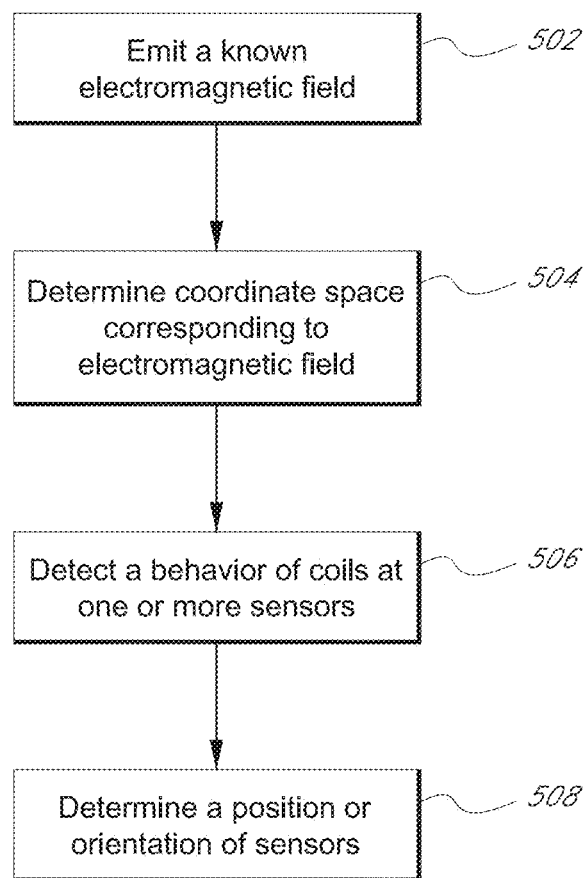
FIG. 5 is a flowchart describing example functioning of an embodiment of an EM tracking system.

Referring now to FIG. 5, an example flowchart describing a functioning of a typical EM tracking system is briefly described. At 502, a known EM field is emitted. In one or more embodiments, the magnetic emitter may generate magnetic fields each coil may generate an electric field in one direction (e.g., X, Y or Z). The magnetic fields may be generated with an arbitrary waveform. In one or more embodiments, the magnetic field component along each of the axes may oscillate at a slightly different frequency from other magnetic field components along other directions. At 504, a coordinate space corresponding to the EM field may be determined. For example, the control 406 of FIG. 4 may automatically determine a coordinate space around the emitter based on the EM field. At 506, a behavior of the coils at the sensors (which may be attached to a known object) may be detected. For example, a current induced at the coils may be calculated. In some embodiments, a rotation of coils, or any other quantifiable behavior may be tracked and measured. At 508, this behavior may be used to detect a position or orientation of the sensor(s) and/or known object. For example, the controller 406 may consult a mapping table that correlates a behavior of the coils at the sensors to various positions or orientations. Based on these calculations, the position in the coordinate space along with the orientation of the sensors may be determined. The order of the blocks in the flowchart in FIG. 5 is intended to be illustrative and not limiting. For example, the block 506 can be performed before the block 504 is performed, in some embodiments.

In the context of AR systems, one or more components of the EM tracking system may need to be modified to facilitate accurate tracking of mobile components. As described above, tracking the user's head pose and orientation may be desirable in many AR applications. Accurate determination of the user's head pose and orientation allows the AR system to display the right virtual content to the user. For example, the virtual scene may include a monster hiding behind a real building. Depending on the pose and orientation of the user's head in relation to the building, the view of the virtual monster may need to be modified such that a realistic AR experience is provided. Or, a position and/or orientation of a totem, haptic device or some other means of interacting with a virtual content may be important in enabling the AR user to interact with the AR system. For example, in many gaming applications, the AR system can detect a position and orientation of a real object in relation to virtual content. Or, when displaying a virtual interface, a position of a totem, user's hand, haptic device or any other real object configured for interaction with the AR system may be known in relation to the displayed virtual interface in order for the system to understand a command, etc. Conventional localization methods including optical tracking and other methods are typically plagued with high latency and low resolution problems, which makes rendering virtual content challenging in many augmented reality applications.

In one or more embodiments, the EM tracking system, discussed in relation to FIGS. 4 and 5 may be adapted to the AR system to detect position and orientation of one or more objects in relation to an emitted EM field. Typical EM systems tend to have a large and bulky EM emitters (e.g., 402 in FIG. 4), which is problematic for head-mounted AR devices. However, smaller EM emitters (e.g., in the millimeter range) may be used to emit a known EM field in the context of the AR system.

Referring now to FIG. 6, an EM tracking system 600 may be incorporated with an AR system as shown, with an EM emitter 602 incorporated as part of a hand-held controller 606. The controller 606 may be movable independently relative to the AR headset (or the belt pack 70). For example, the user can hold the controller 606 in his or her hand, or the controller could be mounted to the user's hand or arm (e.g., as a ring or bracelet or as part of a glove worn by the user). In one or more embodiments, the hand-held controller may be a totem to be used in a gaming scenario (e.g., a multi-degree-of-freedom controller) or to provide a rich user experience in an AR environment or to allow user interaction with an AR system. In some embodiments, the hand-held controller may be a haptic device. In some embodiments, the EM emitter may simply be incorporated as part of the belt pack 70. The controller 606 may include a battery 610 or other power supply that powers that EM emitter 602. It should be appreciated that the EM emitter 602 may also include or be coupled to an IMU 650 component configured to assist in determining positioning and/or orientation of the EM emitter 602 relative to other components. This may be especially advantageous in cases where both the emitter 602 and the sensors (604) are mobile. The IMU 650 may comprise an accelerometer and a gyroscope in some embodiments. Placing the EM emitter 602 in the hand-held controller rather than the belt pack, as shown in the embodiment of FIG. 6, helps ensure that the EM emitter is not competing for resources at the belt pack, but rather uses its own battery source at the controller 606. In some embodiments, the EM emitter 602 may be disposed on the AR headset 58 and the sensors 604 may be disposed on the controller 606 or belt pack 70.

In one or more embodiments, the EM sensors 604 may be placed on one or more locations on the user's headset, along with other sensing devices such as one or more IMUs or additional magnetic flux capturing coils 608. For example, as shown in FIG. 6, sensors (604, 608) may be placed on one or both sides of the head set (58). Since these sensors are engineered to be rather small (and hence may be less sensitive, in some cases), having multiple sensors may improve efficiency and precision. In one or more embodiments, one or more sensors may also be placed on the belt pack 70 or any other part of the user's body or in the controller 606. The sensors (604, 608) may communicate wirelessly or through Bluetooth to a computing apparatus that determines a pose and orientation of the sensors (and the AR headset to which it is attached). In some embodiments, the computing apparatus may reside at the belt pack 70. In some embodiments, the computing apparatus may reside at the headset itself, or even the controller 606. The computing apparatus may in turn include a mapping database (e.g., passable world model, coordinate space, etc.) to detect pose, to determine the coordinates of real objects and virtual objects, and may even connect to cloud resources and the passable world model, in one or more embodiments.

As described above, conventional EM emitters may be too bulky for AR devices. Therefore the EM emitter may be engineered to be compact, using smaller coils compared to traditional systems. However, given that the strength of the EM field decreases as a cubic function of the distance away from the emitter, a shorter radius between the EM sensors 604 and the EM emitter 602 (e.g., about 3 to 3.5 ft) may reduce power consumption when compared to conventional systems such as the one detailed in FIG. 4.

This aspect may either be utilized to prolong the life of the battery 610 that may power the controller 606 and the EM emitter 602, in one or more embodiments. In some embodiments, this aspect may be utilized to reduce the size of the coils generating the magnetic field at the EM emitter 602. However, in order to get the same strength of magnetic field, the power may be need to be increased. This allows for a compact EM emitter unit 602 that may fit compactly at the controller 606.

Several other changes may be made when using the EM tracking system 600 for AR devices. Although this pose reporting rate is rather good, AR systems may require an even more efficient pose reporting rate. To this end, IMU-based pose tracking may (additionally or alternatively) be used in the sensors. Advantageously, the IMUs may remain as stable as possible in order to increase an efficiency of the pose detection process. The IMUs may be engineered such that they remain stable up to 50-100 milliseconds. It should be appreciated that some embodiments may utilize an outside pose estimator module (e.g., IMUs may drift over time) that may enable pose updates to be reported at a rate of 10 to 20 Hz. By keeping the IMUs stable at a reasonable rate, the rate of pose updates may be dramatically decreased to 10 to 20 Hz (as compared to higher frequencies in conventional systems).

If the EM tracking system 600 may be run at, for example, a 10% duty cycle (e.g., only pinging for ground truth every 100 milliseconds), this would be another way to save power at the AR system. This would mean that the EM tracking system wakes up every 10 milliseconds out of every 100 milliseconds to generate a pose estimate. This directly translates to power consumption savings, which may, in turn, affect size, battery life and cost of the AR device.

In one or more embodiments, this reduction in duty cycle may be strategically utilized by providing two hand-held controllers (not shown) rather than just one. For example, the user may be playing a game that requires two totems, etc. Or, in a multi-user game, two users may have their own totems/hand-held controllers to play the game. When two controllers (e.g., symmetrical controllers for each hand) are used rather than one, the controllers may operate at offset duty cycles. The same concept may also be applied to controllers utilized by two different users playing a multi-player game, for example.

Figure 7:
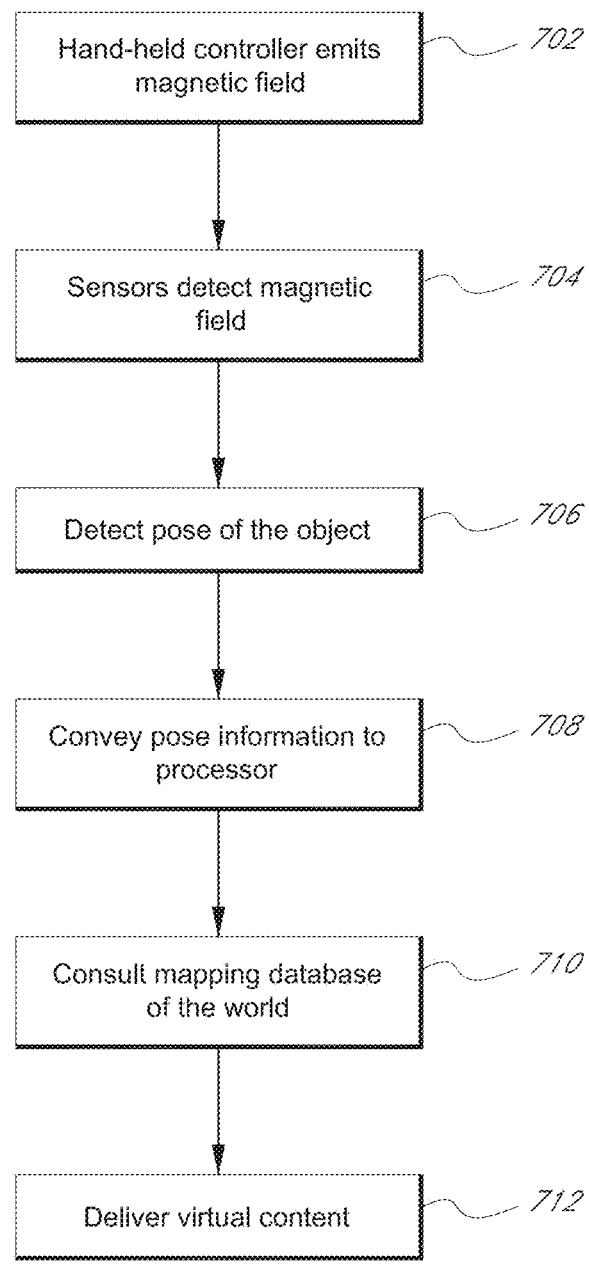
FIG. 7 is a flowchart describing functioning of an example of an EM tracking system in the context of an AR device.

Referring now to FIG. 7, an example flowchart describing the EM tracking system 600 in the context of AR devices is described. At 702, a portable (e.g., hand-held) controller containing an EM emitter emits a magnetic field. At 704, the EM sensors (e.g., placed on headset, belt pack, etc.) detect the magnetic field. At 706, a pose (e.g., position or orientation) of the headset/belt is determined based on a behavior of the coils/IMUs at the sensors. The pose may include a 6DOF pose or have fewer than all six degrees of freedom (e.g., one or more spatial coordinates or one or more orientation angles). At 708, the pose information is conveyed to the computing apparatus (e.g., at the belt pack or headset). At 710, optionally, a mapping database (e.g., passable world model) may be consulted to correlate the real world coordinates (e.g., determined for the pose of the headset/belt) with the virtual world coordinates. At 712, virtual content may be delivered to the user at the AR headset and displayed to the user (e.g., via the light field displays described herein). It should be appreciated that the flowchart described above is for illustrative purposes only, and should not be read as limiting.

Advantageously, using an EM tracking system similar to the one outlined in FIG. 6 enables low latency pose tracking (e.g., head position or orientation, position and orientation of totems, belt packs, and other controllers). This allows the AR system to project virtual content (based at least in part on the determined pose) with a higher degree of accuracy, and very low latency when compared to optical tracking techniques.

Referring to FIG. 8, an augmented reality system configuration is illustrated featuring many sensing components. A head mounted wearable component (58) is shown operatively coupled (68) to a local processing and data module (70), such as a belt pack, here using a physical multicore lead which also features a control and quick release module (86). The control and quick release module (86) can include buttons for operation of the associated system, for example, an on/off button and up/down volume controls. Opposing ends of the module (86) may be connected to electrical leads running between the local processing and data module (70) and the display (62) as shown in FIG. 8.

The local processing and data module (70) is operatively coupled (100) to a hand held component/controller (606), here by a wireless connection such as low power Bluetooth; the component (606) may also be operatively coupled (94) directly to the head mounted wearable component (58), such as by a wireless connection such as low power Bluetooth. Generally where IMU data is passed to coordinate pose detection of various components, a high-frequency connection is desirable, such as in the range of hundreds or thousands of cycles/second or higher; tens of cycles per second may be adequate for EM localization sensing, such as by the sensor (604) and transmitter (602) pairings. Also shown is a global (also referred to as world) coordinate system (10), representative of fixed objects in the real world around the user, such as a wall (8).

Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a wireless transceiver (114), an EM emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124).

The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as EM receiver sensors (604) or display elements (62), wherein it may be valuable to understand if bending of the platform has occurred, such as at a thinned portion of the platform, such as the portion above the nose on the eyeglasses-like platform depicted in FIG. 8.

The head mounted wearable component (58) also features a processor (128) and one or more IMUs (102). Each of the components preferably are operatively coupled to the processor (128), which can include a hardware controller, hardware microprocessor, application specific integrated circuit (ASIC), etc. The component (606) and local processing and data module (70) are illustrated featuring similar components. As shown in FIG. 8, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, EM tracking (as described herein), RADAR, and LIDAR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

In some embodiments, in addition or as an alternative to a LIDAR (106) type of depth sensor, the system includes a generic depth camera or depth sensor, which may, for example, be either a stereo triangulation style depth sensor (such as a passive stereo depth sensor, a texture projection stereo depth sensor, or a structured light stereo depth sensor) or a time or flight style depth sensor (such as a LIDAR depth sensor or a modulated emission depth sensor); further, the system may include an additional forward facing "world" camera (124, which may be a grayscale camera, having a sensor capable of 720p range resolution) as well as a relatively high-resolution "picture camera" (which may be a full color camera, having a sensor capable of two megapixel or higher resolution, for example).

Example Electromagnetic Sensing Components in an AR System

Figure 9A:
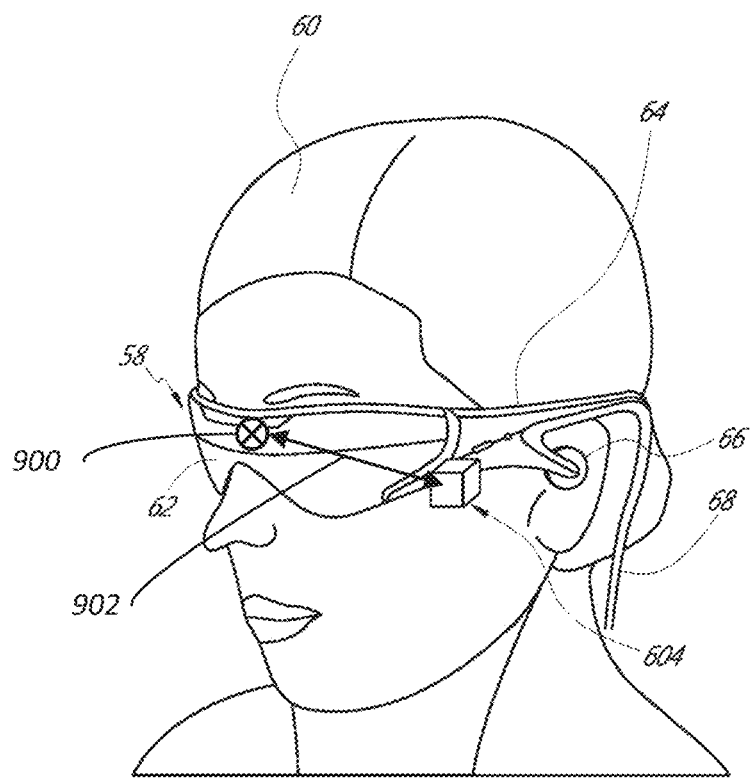
FIGS. 9A and 9B schematically illustrate examples of EM sensing coils coupled to a head-mounted display.
Figure 9B:
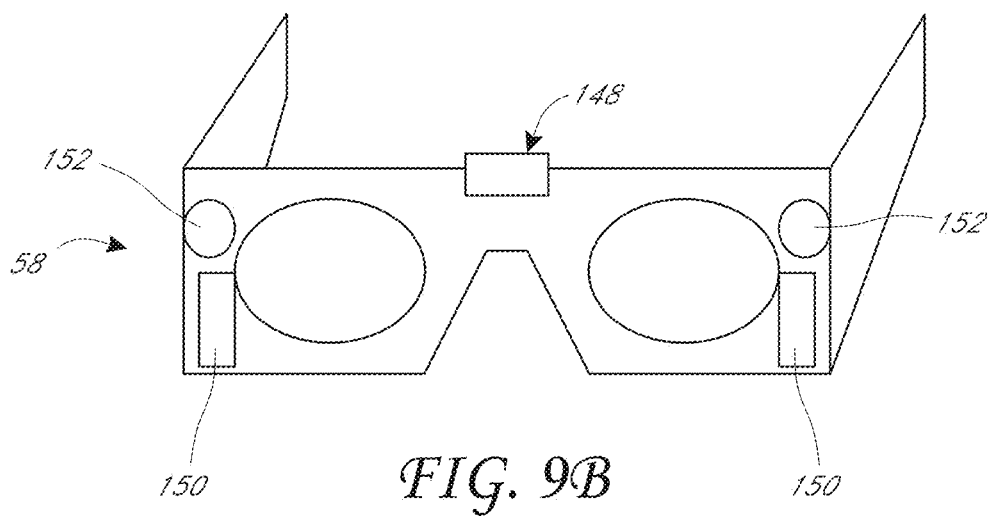

Referring to FIG. 9A, an EM sensing coil assembly (604, e.g., 3 individual coils coupled to a housing) is shown coupled to a head mounted component (58); such a configuration adds additional geometry to the overall assembly which may not be desirable. Referring to FIG. 9B, rather than housing the coils in a box or single housing 604 as in the configuration of FIG. 9A, the individual coils may be integrated into the various structures of the head mounted component (58), as shown in FIG. 9B. FIG. 9B shows examples of locations on the head-mounted display 58 for X-axis coils (148), Y-axis coils (150), and Z-axis coils (152). Thus, the sensing coils may be distributed spatially on or about the head-mounted display (58) to provide a desired spatial resolution or accuracy of the localization and/or orientation of the display (58) by the EM tracking system.

Referring again to FIG. 9B, a distributed sensor coil configuration is shown for the AR device 58. The AR device 58 can have a single EM sensor device (604), such as a housing containing three orthogonal sensing coils, one for each direction of X, Y, Z, which may be coupled to the wearable component (58) for 6 degree of freedom (6DOF) tracking, as described herein. Also as noted above, such a device may be disintegrated, with the three sub-portions (e.g., coils) attached at different locations of the wearable component (58), as shown in FIG. 9B. To provide further design alternatives, each individual sensor coil may be replaced with a group of similarly oriented coils, such that the overall magnetic flux for any given orthogonal direction is captured by the group rather than by a single coil for each orthogonal direction. In other words, rather than one coil for each orthogonal direction, a group of smaller coils may be utilized and their signals aggregated to form the signal for that orthogonal direction. In some embodiments wherein a particular system component, such as a head mounted component (58) features two or more EM coil sensor sets, the system may be configured to selectively utilize the sensor and emitter pairing that are closest to each other (e.g., within 1 cm, 2 cm, 3 cm, 4 cm, 5 cm, or 10 cm) to improve or optimize the performance of the system. In some embodiments, the EM emitter(s) and the EM sensor(s) can be arranged differently. For example, the EM emitter(s) can be disposed in or on the head mounted component (58), and the EM sensor(s) can be disposed in or on the controller (606) or the belt pack (70). As another example, the EM sensor(s) can be disposed in or on the head mounted component (58), and the EM emitter(s) can be disposed in or on the controller (606) or the belt pack (70). As yet another example, the EM emitter(s) can be disposed in or on the belt (70), and the EM sensor(s) can be disposed in or on the controller (606) or the head mounted component (58).

EM tracking updating may be relatively "expensive" in terms of power for a portable system, and may not be capable of very high frequency updating. In a "sensor fusion" configuration, more frequently updated localization information from another sensor such as an IMU may be combined, along with data from another sensor, such as an optical sensor (e.g., a camera or a depth camera), which may or may not be at a relatively high frequency; the net of fusing all of these inputs may place a lower demand upon the EM system and provides for quicker updating. As described herein, in some embodiments, sensor fusion techniques can include fusing or combining IMU (or other sensor) data with EM tracking data to provide a robust estimation of pose of the hand-held component or the head mounted component.

Figure 9C:
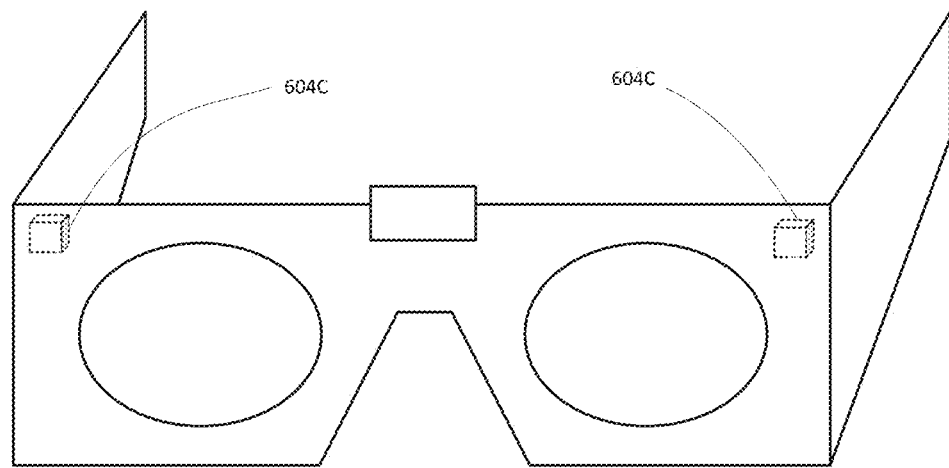
FIGS. 9C and 9D schematically illustrate example head-mounted headsets with multiple EM sensors.
Figure 9D:
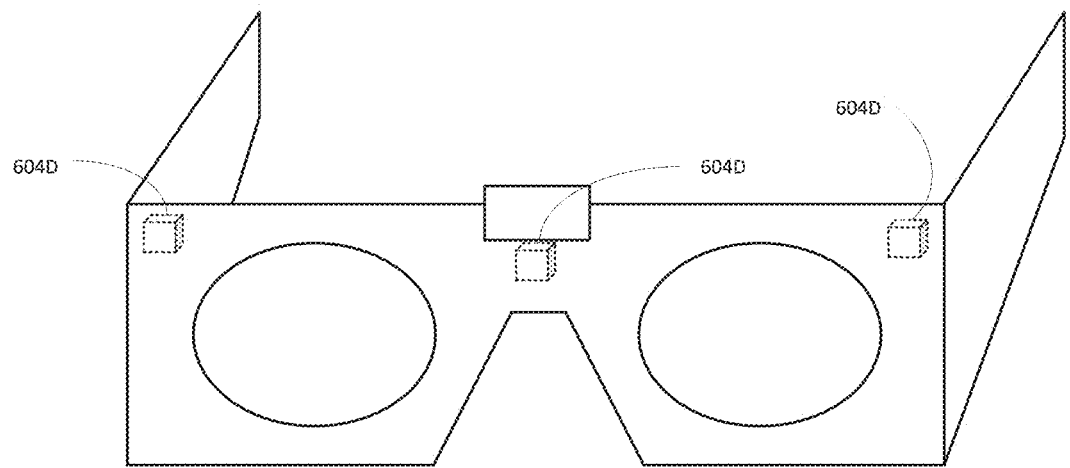
Figure 9E:
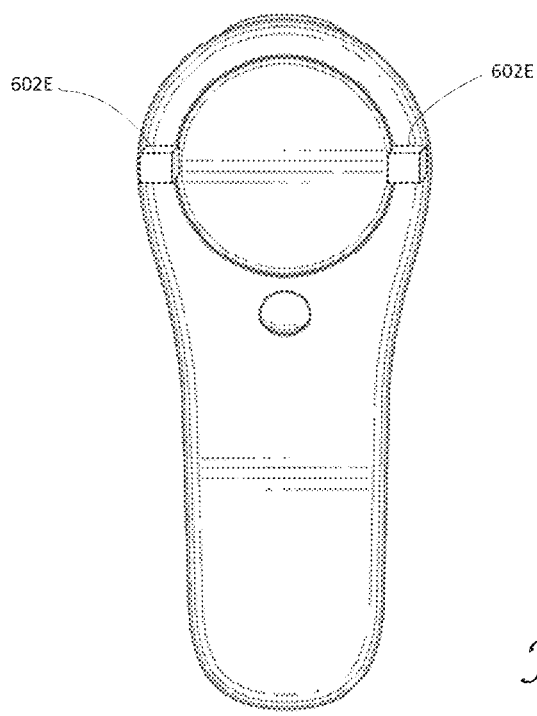
FIGS. 9E and 9F schematically illustrate example controllers with multiple EM emitters.
Figure 9F:
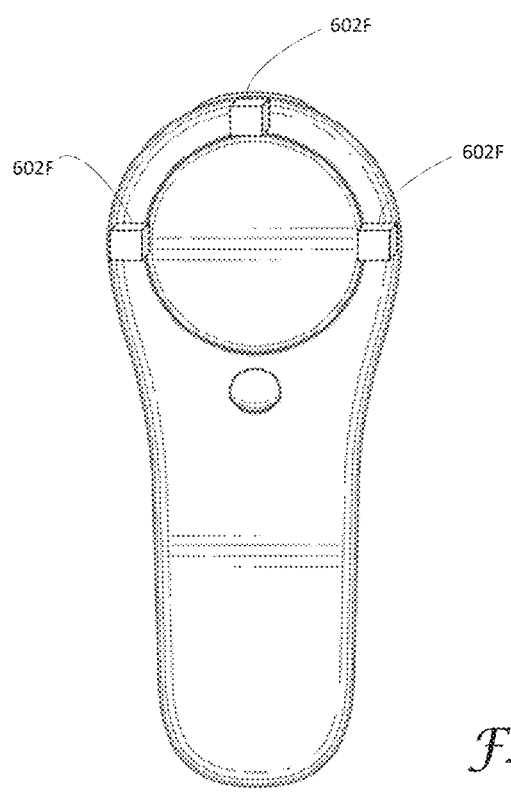

FIGS. 9C and 9D illustrate example headsets with more than one EM sensor 604C, 604D. FIGS. 9E and 9F illustrate example handheld controllers with more than one EM emitters 602E, 602F. Depending on the implementation, the quantity of EM sensors and/or EM emitters may vary, such as to improve accuracy of pose detection generated by the EM tracking system. For example, a headset with two EM sensors 604C (e.g., FIG. 9C) may be used with a controller with one EM emitter, two EM emitters 602E (e.g., FIG. 9E), three EM emitters 602F (e.g., FIG. 9F), or more EM emitters. Similarly a headset with three (or any other quantity) of EM sensors 604D (e.g., FIG. 9D) may be used with a controller with one EM emitter, two EM emitters 602E (e.g., FIG. 9E), three EM emitters 602F (e.g., FIG. 9F), or more EM emitters.

Embodiments with multiple EM sensors on different sides of the headset (e.g., FIG. 9C) may reduce the effect of metal distortion. For example, in some implementation the input from the sensors 604C may be weighted based on proximity or position with reference to the controller. For example, if the controller is to the right of the user, a sensor 604 on the right side of the headset may have a higher weighted input to than another sensor has a less direct communication channel with the controller (e.g., sensors on the left side or middle of the headset).

Use of multiple sensors may further provide data that is usable to quantitatively monitor distortion that may be caused by interference of EM signals between an EM emitter and the multiple EM sensors. For example, with two sensors on the headset in known locations, you can use the two resolved position vectors between the sensors and the controller to form a triangle. This "sensed" displacement between the sensors may be compared with the "known" value from CAD. This quantitative estimate of distortion may then be used to provide feedback to the user, software applications, etc., such as an indication of "expected distortion" (e.g., the distortion effect measured between the headset and controller in a clean environment) and "environmental distortion" (e.g., after subtracting out the expected distortion, the amount of distortion that remains). Similar weighting and distortion calculations may be determined in configurations having with other quantities of emitters and sensors.

Examples of EM Tracking of User Head Pose or Hand Pose

Figure 10:
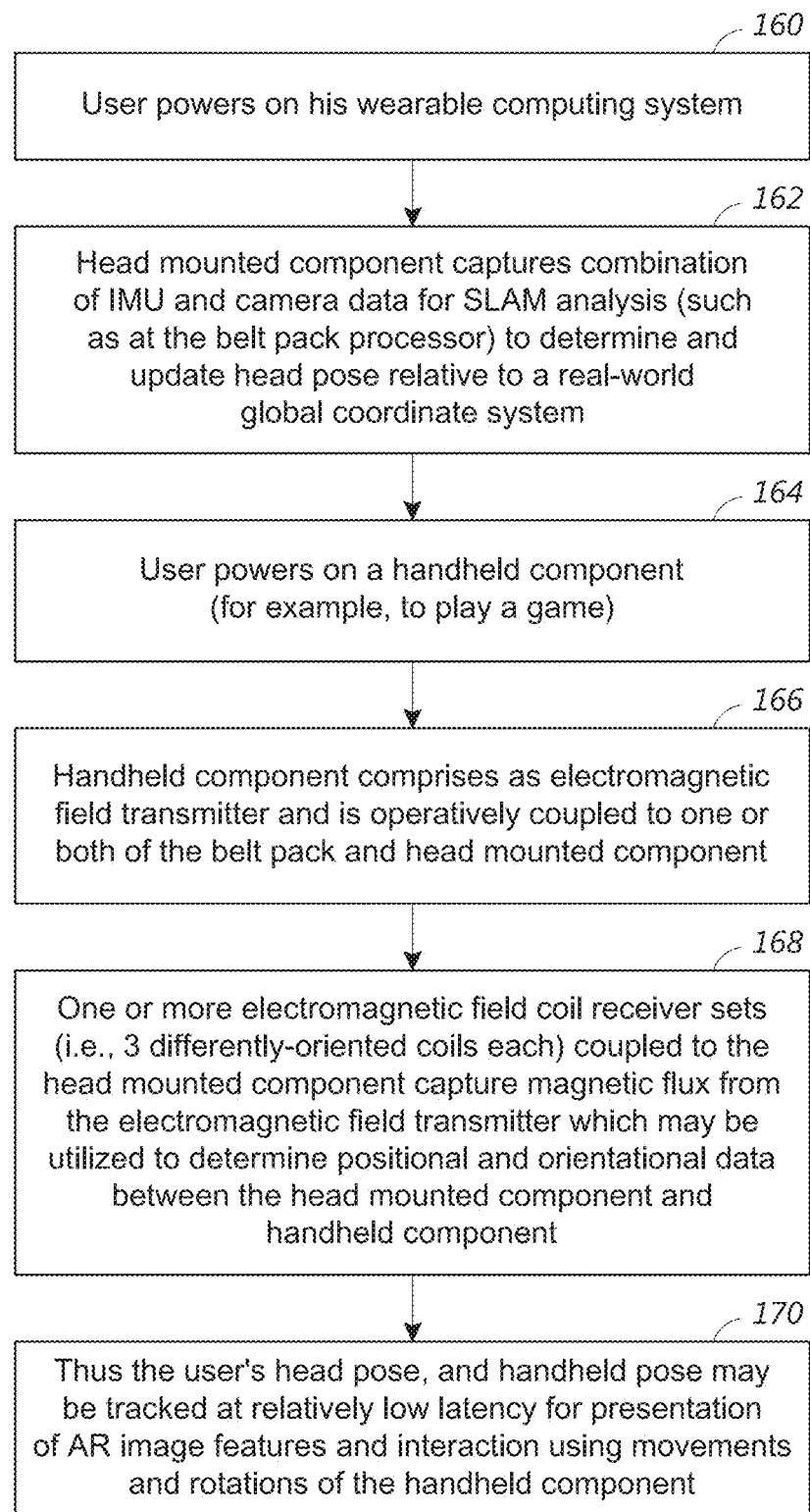
FIGS. 10 and 11 are flowcharts that illustrate examples of pose tracking with an EM tracking system in a head-mounted AR system.

Referring to FIG. 10, in one embodiment, after a user powers up his or her wearable computing system (160), a head mounted component assembly may capture a combination of IMU and camera data (the camera data being used, for example, for SLAM analysis, such as at the belt pack processor where there may be more raw processing horsepower present) or EM tracking system data to determine and update head pose (e.g., position or orientation) relative to a real world global coordinate system (162; an example of the real world global coordinate system 10 is shown in FIG. 8). The user may also activate a handheld component to, for example, play an augmented reality game (164), and the handheld component may include an EM transmitter operatively coupled to one or both of the belt pack and head mounted component (166). One or more EM field coil receiver sets (e.g., a set being 3 differently-oriented individual coils) coupled to the head mounted component to capture magnetic flux from the transmitter, which may be utilized to determine positional or orientational difference (or "delta"), between the head mounted component and handheld component (168). The combination of the head mounted component assisting in determining pose relative to the global coordinate system, and the hand held assisting in determining relative location and orientation of the handheld relative to the head mounted component, allows the system to generally determine where each component is relative to the global coordinate system, and thus the user's head pose, and handheld pose may be tracked, preferably at relatively low latency, for presentation of augmented reality image features and interaction using movements and rotations of the handheld component (170).

Figure 11:
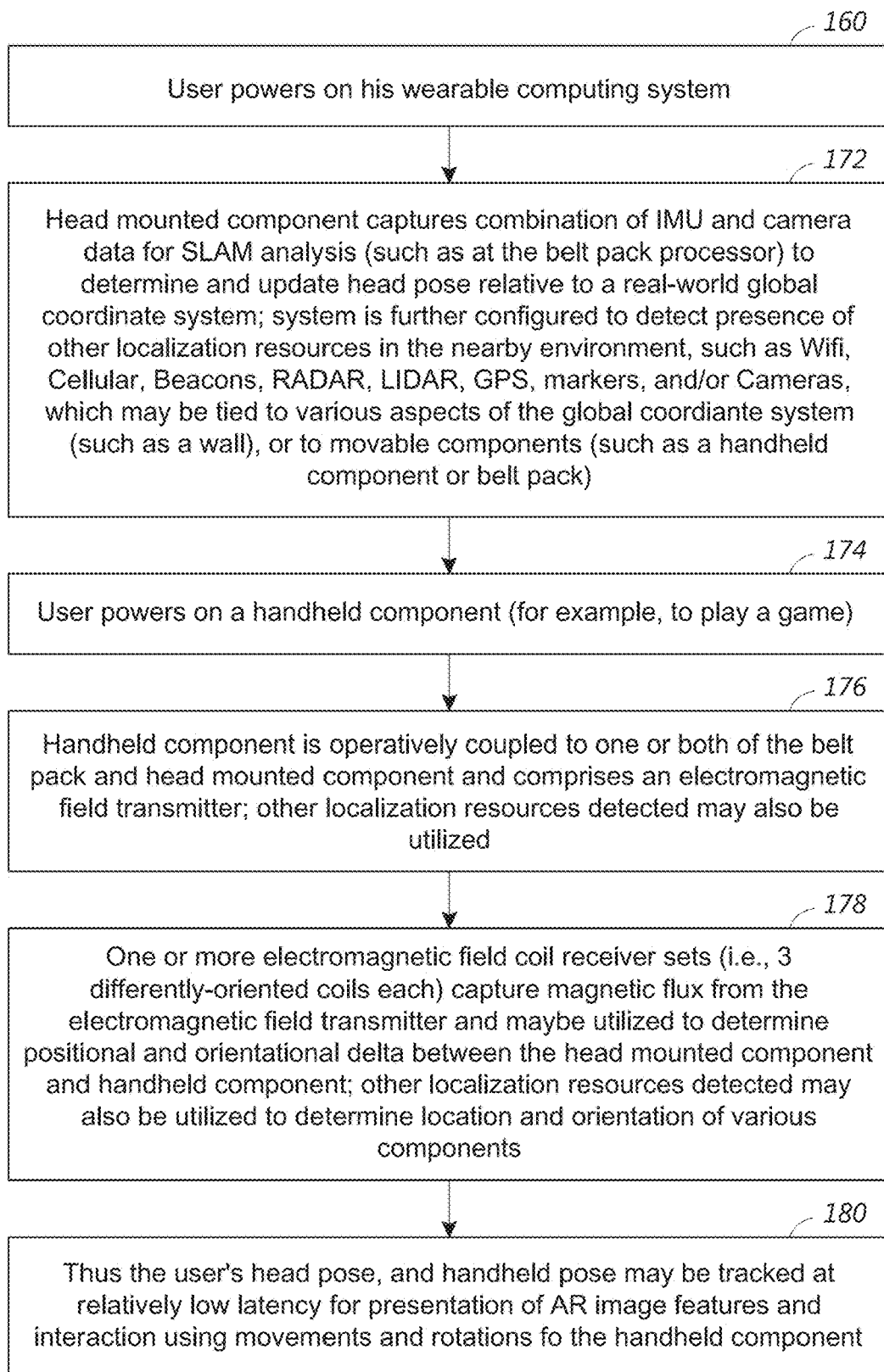

Referring to FIG. 11, an embodiment is illustrated that is somewhat similar to that of FIG. 10, with the exception that the system has many more sensing devices and configurations available to assist in determining pose of both the head mounted component (172) and a hand held component (176, 178), such that the user's head pose, and handheld pose may be tracked, preferably at relatively low latency, for presentation of augmented reality image features and interaction using movements and rotations of the handheld component (180).

In various implementations, the augmented reality device can include a computer vision system configured to implement one or more computer vision techniques to identify objects in the environment of the system, user gestures, or perform other computer vision procedures used or described herein. For example, as described below, the computer vision system can analyze images of the user input device/controller 606 taken by an outward-facing camera 124 to determine the pose (e.g., position or orientation) of the device for use in compensating for EM distortion in an electromagnetic tracking system. Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Meanshift algorithm, visual simultaneous location and mapping (vSLAM) techniques, a sequential Bayesian estimator, a Kalman filter, an extended Kalman filter, bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Overview of Electromagnetic Localization

EM localization is based on magnetic field coupling measured by one or more EM sensors derived from excitation of magnetic fields by one or more EM emitters. There are two common ways of exciting the magnetic fields. One is based on a pulsed alternating current (AC) field, and the other is based on a pulsed direct current (DC) field. At present, EM tracking systems utilizing an AC EM field are more common, because they tend to be less sensitive to noise. As described with reference to FIGS. 9A and 9B, for 6DOF localization, the EM sensor (e.g., the EM sensor 604) and the EM emitter (e.g., the EM emitter 602) can each include three orthogonally-aligned coils (e.g., along respective X, Y, Z axes). In many applications using this configuration, the emitter coil currents in the EM emitter 602 are pulsed sequentially (e.g., in X, then in Y, and then in Z), and the resultant magnetic fields induce currents in each sensor coil in the EM sensor 604 that are then used to determine the position or orientation of the sensor coil relative to the emitter coil and thus the EM sensor 604 relative to the EM emitter 602.

Without being bound or limited by the following theoretical development, an EM model for EM localization will now be presented. In this model, the magnetic field generated by the emitter coils in the EM emitter 602 is assumed to be an equivalent magnetic dipole field (which tends to be accurate when the size of the emitter coils in the EM emitter 602 is smaller than the distance between the emitter coils and sensor coils). The dipole field decreases with increasing distance between the EM emitter 602 and the EM sensor 604 as the inverse cube of the distance.

The equations for 6DOF localization can use Euler angle transformations (or quaternions) to describe the position and orientation of the EM sensor 604 with respect to the EM emitter 602. The EM field sensed by the EM sensor 604 may be represented by a matrix equation:

$$F = \frac{c}{r^3} TP^{-1} KPE, \quad (1)$$

where F is a 3×3 EM field matrix, c is a constant for any given coil configuration (e.g., proportional to a product of a number of loops of wire, an area of the loops, and a sensor gain), r is the distance between the EM emitter 602 and the EM sensor 604, T is a 3×3 rotation matrix representing a 3 degree of freedom (3DOF) orientation of the EM sensor 604 with respect to the EM emitter 602, P is a 3×3 rotation matrix representing the position of the EM sensor 604 with respect to the EM emitter 602, K is a 3×3 diagonal matrix with diagonal elements proportional to [1, −½, −½], and E is a 3×3 diagonal matrix where diagonal elements represent the strengths of the EM fields measured by the three orthogonal emitter coils of the EM emitter 602. The matrix P may be represented in terms of an azimuthal angle θ and a pitch φ by:

$$P = \text{roty}(\varphi) \Box \text{rotz}(\theta), \quad (2)$$

where roty is a 3×3 rotation matrix around the Y-axis and rotz is a 3×3 rotation matrix around the Z-axis.

As the elements of the matrices involve trigonometric functions, Equation (1) is actually a system of simultaneous nonlinear equations with six unknowns (three position variables and three orientation variables), which can be solved simultaneously (e.g., via iterative numerical techniques) to obtain the 6DOF pose of the EM sensor 604 with respect to the EM emitter 602. The positions and orientations from the method described above may have to be transformed to a different frame of reference, because of the placement of the EM sensor coils with respect to a global frame of reference. This frame (or frame of reference) is sometimes called the world frame (or world frame of reference or world or global coordinate system). An example of a world coordinate system 10 is described with reference to FIG. 8. In some implementations, the world coordinate system 10 is established when the AR device is turned on by the user, for example, when the user's initial head pose is determined. The origin of the world frame can be set at any point in the environment, for example, a corner of a room in which the user is operating the device could be set as the origin (e.g., with coordinates (0,0,0) in a Cartesian system).

Overview of Sensor Fusion for an Augmented Reality System

Figure 12:
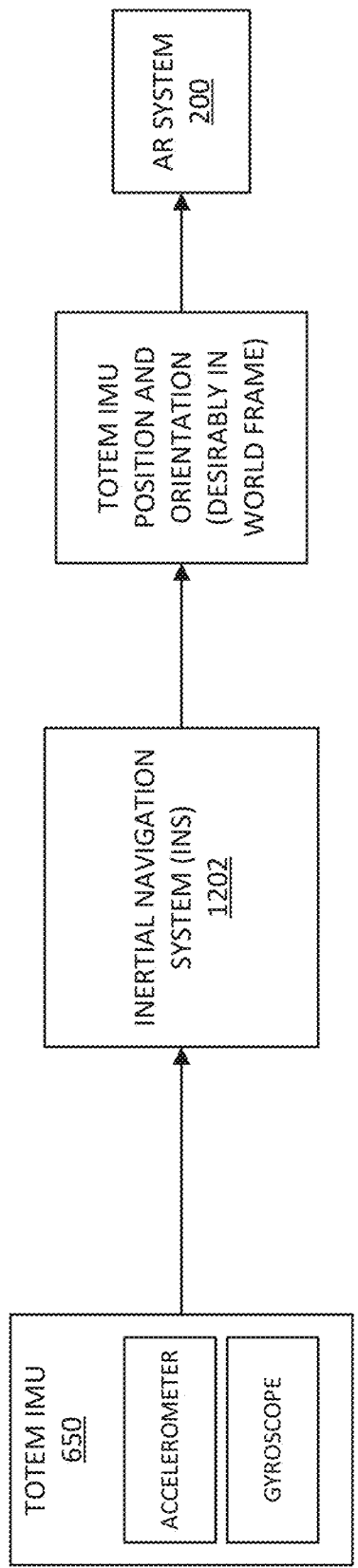
FIG. 12 is a block diagram that schematically illustrates an example of an inertial navigation system (INS) that can accept input from an IMU on a handheld user-input device and provide the device's pose (e.g., position or orientation) in a world frame associated with an AR system.

FIG. 12 is a block diagram for an example of an inertial navigation system (INS) 1202 that can accept input from an IMU 650 on a handheld user-input device (e.g., the handheld controller/totem 606 described with reference to FIGS. 6 and 8) and provide the totem's 6DOF pose (e.g., position and orientation) in a world frame (e.g., the world coordinate system 10) associated with an AR system 200. The AR system 200 can utilize the 6DOF pose, for example, as described with reference to the flowcharts in FIGS. 7, 10, and 11.

As described herein, the totem IMU 650 can include, among other components, an accelerometer and a gyroscope. The accelerometer provides acceleration a(t) as a function of time, measured in the frame of reference of the totem. The gyroscope provides angular velocity ω(t) as a function of time, measured in the frame of reference of the totem.

The INS 1202 can include a hardware processor that integrates the acceleration data twice to obtain the position of the totem 606 and integrates the angular velocity once to obtain the angular orientation of the totem 606 (e.g., expressed as Euler angles or quaternions). For example, the position x(t) of the totem 606 can be written as:

$$x(t) = x_0 + v_0 t + \int_0^t dt' \int_0^{t'} a(t'') dt'' \quad (3)$$

where $x_0$ and $v_0$ are integration constants representing the initial position and velocity of the totem, respectively, at time t=0. The orientation θ(t) of the totem 606 can be written as:

$$\theta(t) = \theta_0 + \int_0^t \omega(t') dt' \quad (4)$$

where $\theta_0$ is an integration constant representing the initial angular orientation of the totem at time t=0.

There are several challenges when implementing Equations (3) and (4). First, the initial position, orientation, and angular orientation of the totem 606 in the world frame of reference of the AR system 200 generally are not known.

Therefore, the integration constants $x_0$, $v_0$, and $\theta_0$ may be difficult to determine without additional information or input from other sensors to link the position and orientation of the frame of reference of the IMU to the world frame of reference of the AR system 200 at the initial time (e.g., t=0). This link between the two frames of reference may sometimes be referred to herein as an offset, as it represents the offset between the position of the totem relative to the world frame of reference of the AR system 200 at the initial time (e.g., t=0).

The data from the totem IMU 650 generally is subject to error, nonlinearity, and noise. For example, the output from the accelerometer or gyroscope may have a bias, which is an offset from the true acceleration or angular velocity. For some sensors, the bias may be a function of time, temperature, orientation of the sensor, power source voltage, and so forth. Thus, the bias (which is unknown) can change over time in an unknown manner. Even if the sensor is initially calibrated to remove the bias that is present in the sensor, bias will tend to develop over time.

Error in the accelerometer and gyroscope data can lead to drift of the position and orientation, respectively, determined from Equations (3) and (4). Because of the double integration in Equation (3), error in accelerometer data leads to a drift in determined position that increases quadratically with time. Because of the single integration in Equation (4), error in gyroscope data leads to drift in determined orientation that increases linearly with time. If uncorrected, these drifts can cause the determined position and orientation to depart substantially from the actual position and orientation.

As will be described below, input from sensors additional to the totem IMU 650 can be fused with the IMU data (e.g., accelerometer data and gyroscope data) to reduce the drift and to link the position and orientation of the totem to the world frame of reference of the AR system 200. Sensor fusion algorithms such as, for example, a Kalman filter, can be used to fuse the sensor data inputs together with a model of the sensor error state and frame of reference offset. For example, the Kalman filter can provide robust predictions of the pose of the totem in the presence of sensor bias, noise and offset for the initial pose of the totem in the world frame of reference of the AR system 200. Although the embodiments described below utilize a Kalman filter, other statistical filters or stochastic data fusion techniques can be used. For example, a Kalman filter can include an extended Kalman filter, an unscented Kalman filter, or any other variety of Kalman filter. The stochastic data fusion techniques can include a Markov model, Bayesian filtering, linear quadratic estimation, and so forth. Further, although described in terms of estimating a 6DOF pose of the totem (e.g., position and orientation), this is not a requirement, and in other embodiments, the sensor fusion system can estimate a 3DOF pose (e.g., position or orientation).

As an illustrative example, in the case where the initial velocity $v_0$ of the totem is zero, a model for the position of the totem can be written as:

$$x(t) = \text{offset}_x + \int_0^t dt' \int_0^{t'} [a(t'') - \varepsilon(t'')] dt'' \quad (5)$$

where $\text{offset}_x$ is an estimate of the position error between the world frame of reference of the AR system 200 and the accelerometer frame of reference (relative to an arbitrarily chosen coordinate origin), and $\varepsilon(t)$ is an error state estimate to correct for bias in the accelerometer output. An analogous equation can be written for the angular orientation $\theta(t)$:

$$\theta(t) = \text{offset}_\theta + \int_0^t [\omega(t') - \delta(t')] dt' \quad (6)$$

where $\text{offset}_\theta$ is an estimate of the angular error between the world frame of reference of the AR system 200 and the gyroscope frame of reference (relative to an arbitrarily chosen coordinate origin), and $\delta(t)$ is an error state estimate to correct for bias in the gyroscope output (angular velocity). The Kalman filter (or other appropriate filter) can provide estimates of the error states (e.g., the offsets, $\varepsilon$, and $\delta$) as will be further described below.

Example System for Sensor Fusion

Figure 13A:
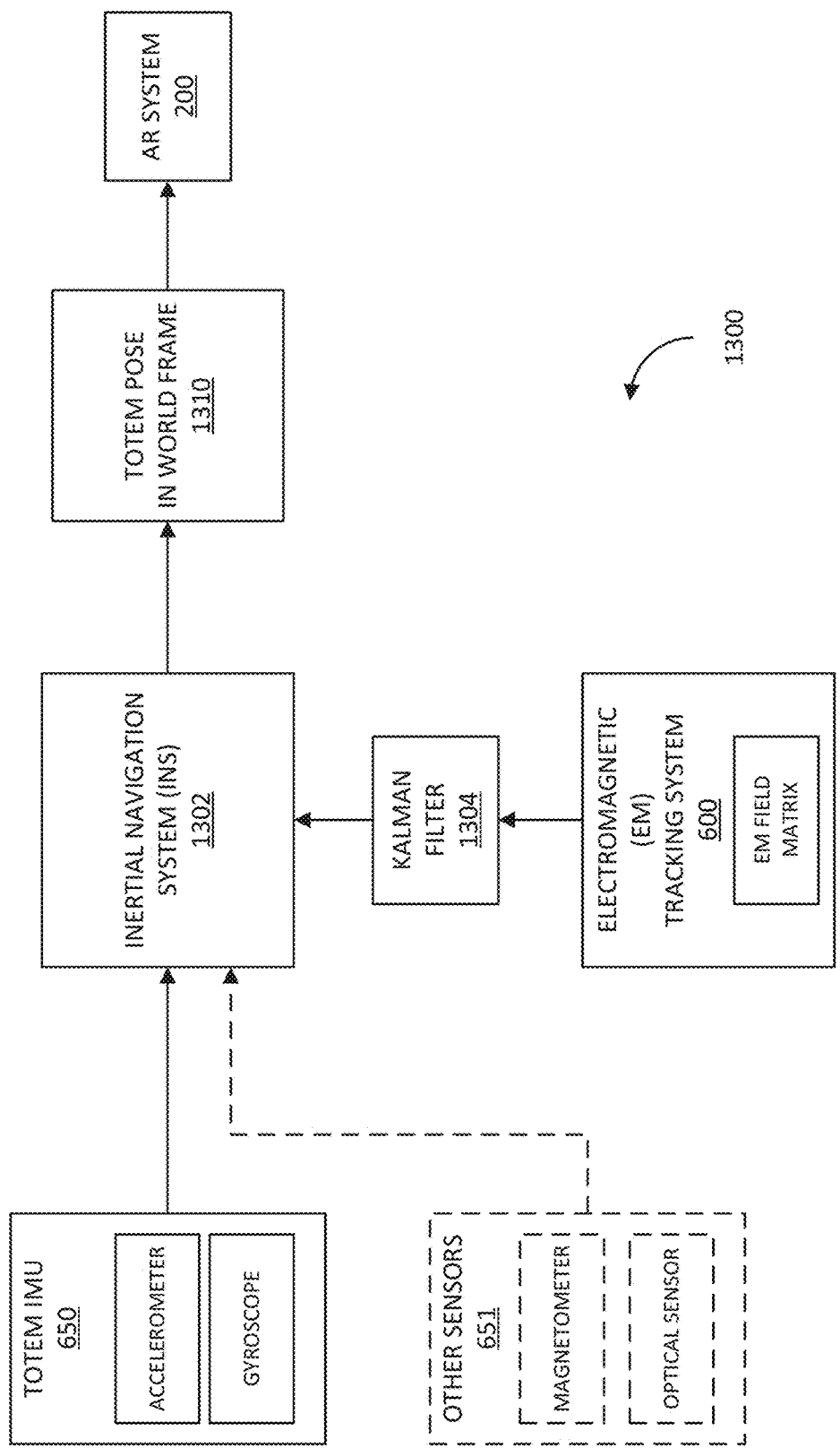
FIGS. 13A-13C are block diagrams that schematically illustrate an example of a sensor fusion system usable with an augmented reality display system.

FIG. 13A is a block diagram that schematically illustrates an example of a sensor fusion system 1300 usable with an AR system 200 such as, for example, described with reference to FIG. 2A-2D, 6, or 8. Embodiments of the sensor fusion system 1300 address some or all of the challenges described above with reference to FIG. 12.

The sensor fusion system 1300 includes an inertial navigation system (INS) 1302 configured to receive and fuse sensor data from multiple types of sensors. For example, as shown in FIG. 13A, the INS 1302 can receive input data from the totem IMU 650, an EM tracking system 600, and additionally or optionally, other sensors 651. As described herein, the totem IMU 650 can include, among other components, an accelerometer and a gyroscope. The other sensors 651 can include, among other components, a magnetometer and an optical sensor (e.g., in outward-facing or inward-facing camera).

Embodiments of the EM tracking system 600 have been described above with reference to FIGS. 6 to 11. For example, the totem 606 can include an EM emitter 602 that emits an EM field, and the head-mounted AR headset 58 can include an EM sensor 604 that measures the emitted EM field and calculates a pose (3DOF or 6DOF) of the EM sensor 604 with respect to the EM emitter 602. For example, the 6DOF pose can be calculated from the EM field matrix F described above with reference to Equation (1).

In other implementations, the EM emitter 602 can be disposed in the AR headset 58, and the EM sensor 604 can be disposed in the totem 606. See, for example, the description of various arrangements of EM sensors and emitters with reference to FIGS. 9A and 9B.

The sensor fusion system 1300 includes a Kalman filter 1304 that can estimate the error states for totem pose (e.g., as described with reference to Equations (5) and (6)). The Kalman filter 1304 can utilize models for how the totem IMU 650 should be behaving (e.g., without bias, noise, etc.) and compare these models to the actual measurements from the sensors (e.g., totem IMU 650, EM tracking system 600, and (optionally) other sensors 651). The Kalman filter 1304 uses the differences between model and measurement to provide a better estimate of the totem pose. For example, the Kalman filter 1304 can predict an estimate of the current state of the totem pose and compare this state to the data from the sensors being fused (e.g., IMU 650, EM tracking system 600, and (optionally) other sensors 651) in order to generate the error states. Knowledge of the error states can be used to update the state of the totem pose (e.g., via Equations (5) and (6)). As noted above, use of a Kalman filter 1304 is not a requirement, and in other embodiments, other statistical filters or stochastic data fusion techniques can be used such as, for example, a Markov model, Bayesian filtering, linear quadratic estimation, and so forth.

The INS 1302 uses the Kalman filter to fuse the inputs from the totem IMU and the EM tracking system (and optionally any other sensors 651) in order to provide estimates of the totem pose that statistically tend to be more accurate than pose estimates using input just from the totem IMU 650 or just from the EM tracking system 600. For example, the Kalman filter 1304 can correct for the drift of the totem pose (e.g., due to sensor bias, noise, etc.) and adjust for the offset with respect to the world frame of reference of the AR system 200.

Accordingly, the sensor fusion system 1300 can determine the totem pose (e.g., 3DOF or 6DOF) in the world frame of reference of the AR system 200 and provide this totem pose to the AR system 200. The AR system 200 can use totem pose in the world frame of reference of the AR system 200 to, for example, deliver virtual content to the user of the AR system (see, e.g., FIGS. 7, 10, 11). The sensor fusion technique provides a more accurate and robust estimate of the totem pose, thereby leading to improved delivery of virtual content to the user and an improved user experience with the AR system 200.

Figure 13B:
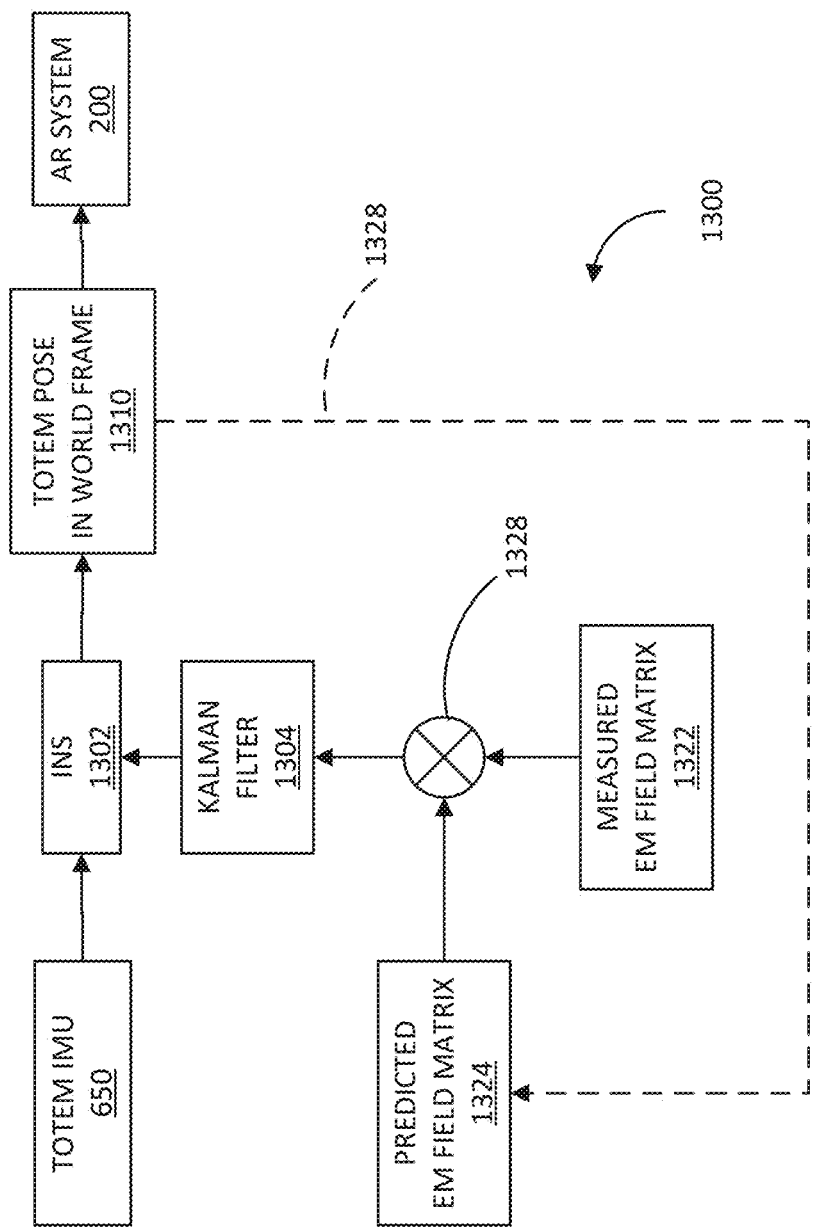
Figure 13C:
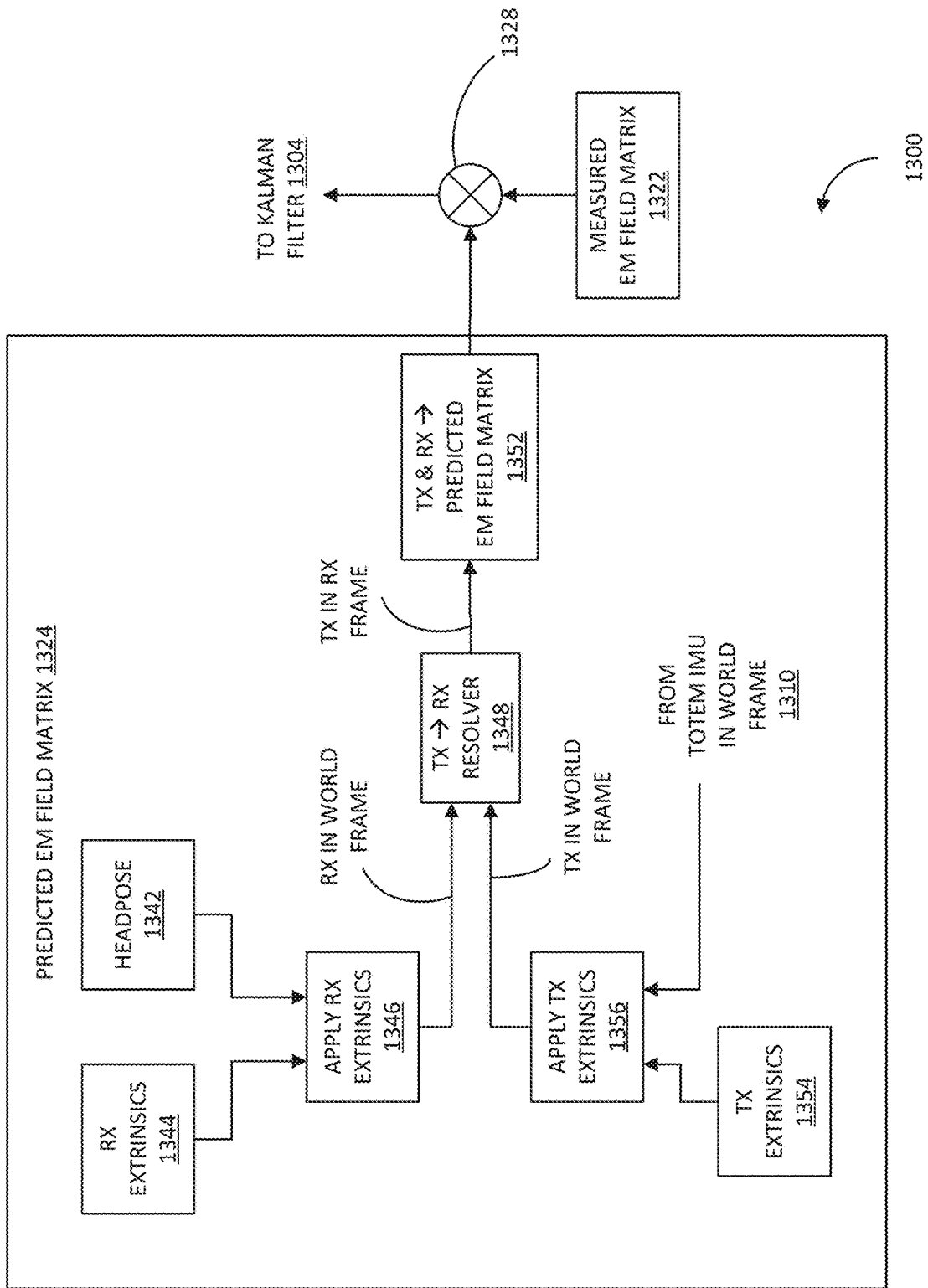

FIGS. 13B and 13C provide additional illustrative features of the sensor fusion system 1300. As described above with reference to Equation (1), the EM tracking system 600 uses an EM field matrix 1322 measured by the EM sensors 604 to determine totem pose. The measured EM field matrix 1322 is a 3×3 matrix denoted by F and has nine components. In FIG. 13B, the measured EM field matrix 1322 is compared to a predicted EM field matrix 1324 that represents the system's estimate of what the totem pose is expected to be. The comparison can include a difference 1328 between the predicted EM field matrix 1324 and the measured EM field matrix 1322. The comparison between the predicted and the measured EM field matrices 1324, 1322 provides an estimate of the error states used by the Kalman filter 1304. For example, when the difference between the predicted and the measured EM field matrices 1324, 1322, is relatively small, there may not be much drift due to sensor bias or noise, and the determination of the totem pose by the INS 1302 may be relatively accurate. As drift accumulates, the difference between the predicted and the measured EM field matrices 1324, 1322 may increase, and the Kalman filter 1304 acts to restore the accuracy of the totem pose 1310. As shown by a dashed line 1328 in FIG. 13B, the current value of the totem pose in the world frame 1310 can be fed back into the prediction for where the totem 606 is expected to be. The Kalman filter 1304 thus works recursively to provide an improved or optimal determination of the totem pose in the world frame 1310 by fusing the inputs from the totem IMU 650 and the EM tracking system 600 (and optionally the other sensors 651).

FIG. 13C illustrates an example of how the predicted EM field matrix 1324 can be determined by the sensor fusion system 1300. In FIG. 13C, the EM emitter 602 is labeled "TX" (short for transmitter), and the EM sensor 604 is labeled "RX" (short for receiver). The block diagram in FIG. 13C illustrates an example of how measurements made by the EM emitter 602 and the EM sensor 604 are transformed to the world frame of reference of the AR system 200. In this example, the EM emitter 602 is presumed to be located in the totem 606 (see, e.g., FIG. 6), and the EM sensor 604 is presumed to be located in the AR headset 58 (see, e.g., FIG. 9A). This arrangement of the EM emitter 602 and the EM sensor 604 is not a limitation, and in other embodiments, the processing described with reference to FIG. 13C could be modified for other arrangements (e.g., EM emitter 602 in the AR headset 58 and EM sensor 604 in the totem 606).

At block 1342, the system 1300 accesses headpose data indicative of the pose of the AR headset 58 in the world frame of reference of the AR system 200. As described above with reference to FIG. 8, sensors in the AR headset 58, such as an IMU 102 or outward-facing world cameras 124, can be used to determine the pose of the headset 58. For example, the cameras 124 may be utilized to capture data which may be utilized in simultaneous localization and mapping protocols, or "SLAM", to determine where the AR headset 58 is and how it is oriented relative to other components in the system 200 or the world. The pose (e.g., position and orientation) of the AR headset 58 can be referenced to a fiducial origin 900 relative to the AR headset 58. For example, as schematically shown in FIG. 9A, the fiducial origin 900 may be at a point near the center of the headset 58, for example, substantially between a pair of outward-facing world cameras.

As can be seen from FIG. 9A, the EM sensor 604 may not be located at the fiducial origin 900 of the AR headset 58, but displaced from the origin by a displacement 902 (shown as a double-headed arrow). Thus, measurements made by the EM sensor 604 may not represent the pose of the AR headset 58 relative to the fiducial origin 900, because of this displacement 902. The displacement of the EM sensor 604 relative to the fiducial origin 900 can be stored by the sensor fusion system 1300 at block 1344 of FIG. 13C, which is labeled "RX Extrinsics." To adjust the measurements made by the EM sensor 604 to reflect the position of the AR headset 58 in the world frame of reference of the AR system 200, at block 1344 of FIG. 13C, the RX Extrinsics (e.g., the displacement 902) can be applied to the EM sensor 604 measurements. The output of the block 1346 is the pose (e.g., position and orientation) of the EM sensor 604 in the world frame of reference of the AR system 200 (labeled as "RX in World Frame" in FIG. 13C).

Turning to the lower portion of FIG. 13C, an analogous procedure may be used to determine the pose of the EM emitter 602 in the world frame of reference of the AR system 200 (labeled as "TX in World Frame" in FIG. 13C). Similarly to the EM sensor 604 being displaced from a fiducial origin of the AR headset 58, the EM emitter 602 may be displaced from a fiducial origin 660 that represents the position of the totem 606 in the world frame of reference of the AR system 200. Returning to the example shown in FIG. 6, the totem 606 includes a fiducial origin 660 that is displaced by a displacement 662 from the position of the EM emitter 602. The fiducial origin 660 of the totem 606 can be selected at any suitable location, for example, at the center-of-mass of the totem 606 or at the volumetric center of the totem 606.

The displacement of the EM emitter 602 relative to the fiducial origin 660 of the totem 606 can be stored by the sensor fusion system 1300 at block 1354 of FIG. 13C, which is labeled "TX Extrinsics." In order to know where the fiducial origin 660 of the totem 606 is in the world frame of reference of the AR system 200, totem pose data from block 1310 (see FIG. 13B) can be used. To adjust the EM emitter 602 to reflect the position of the totem 606 in the world frame of reference of the AR system 200, the TX Extrinsics (e.g., the displacement 662) and the totem pose of the fiducial origin 660 can be applied at block 1356 of FIG. 13C. In effect, the totem pose in the world frame 1310 provides the position and orientation of the fiducial origin 660 of the totem 606 in the world frame of reference of the AR system 200, and the TX Extrinsics 1354 adjusts for the fact that the EM emitter 602 may be displaced from the fiducial origin 660.

The output of the block 1356 is thus the pose (e.g., position and orientation) of the EM emitter 602 in the world frame of reference of the AR system 200 (labeled as "TX in World Frame" in FIG. 13C). Accordingly, at this point in the procedure, the predicted pose of both the EM sensor 604

(RX) and the EM emitter 602 (TX) are determined in the same frame of reference, namely, the world frame of reference of the AR system 200.

At block 1348, labeled TX→RX Resolver", the relative pose of the EM emitter 602 with respect to the EM sensor 604 can be determined. The relative pose may include the distance r between the EM emitter 602 and the EM sensor 604 and the angular orientation (e.g., azimuthal angle and pitch angle) of the EM sensor 604 relative to the EM emitter 602.

At block 1352, the relative pose of the EM emitter 602 and the EM sensor 604 can be used to determine the values of the EM field matrix 1324 that would be predicted to occur for that particular relative pose between the EM emitter 602 and the EM sensor 604. For example, the predicted EM field matrix 1324 can be calculated from Equations (1) and (2) since the distance r and the orientation angles (e.g., azimuth and pitch) are determined from the relative pose.

Thus, the output of the block 1324 in FIG. 13C provides a prediction for the EM field matrix, which can be compared with the actual, measured EM field matrix 1322 as described with reference to FIG. 13B. The difference, if any, between the predicted and measured EM field matrices can be used by the Kalman filter 1304 to provide error state estimates used by the INS 1302 to update the totem pose in the world frame 1310.

FIG. 13C illustrates calculation of the predicted EM field matrix 1324 for an example system where the EM emitter 602 is disposed in or on the totem 606 and the EM sensor 604 is disposed in or on the head-mounted wearable display 58. This is for the purpose of illustration and not limitation. In other implementations, the EM emitter 602 may be disposed in or on the head-mounted wearable display 58, and the EM sensor 604 may be disposed in or on the totem 606. In such an implementation, the RX extrinsics may include a displacement of the EM sensor 604 relative to a fiducial position of the totem 606, and the TX extrinsics may include displacement of the EM emitter 602 relative to a fiducial position of the head-mounted display 58.

In some implementations of the sensor fusion system 1300, the totem IMU 650 operates at about 250 Hz. The INS 1302 integrates the IMU data while applying the error state estimates from the Kalman filter 1304 to determine the totem pose in the world frame 1310. For example, the INS 1302 may evaluate Equations (5) and (6). The EM tracking system 600 may operate at a different rate than the IMU 650 (e.g., 240 Hz). Whenever new data from the EM tracking system 600 is obtained, the procedure described with reference to FIG. 13B/13C can be performed to supply measured and predicted EM field matrices to the Kalman filter 1304. This process may be iterated as new IMU 650 or EM tracking system 600 data is obtained in order to provide updated world-frame totem poses to the AR system 200 in real time. The use of the sensor fusion system 1300 advantageously may permit the AR system 200 to operate with reduced latency, improved performance (e.g., since the totem pose will be more robust and accurate), and thereby provide an improved user experience.

Initialization

When the AR system 200 is started up (or re-booted), the sensor fusion system 1300 may be initialized. For example, the initial totem pose may be calculated by the EM tracking system 600 from the measured EM field matrix 1322. As the sensor integration and filtering proceeds, the estimated totem pose may be improved in accuracy by virtue of the optimization performed by the Kalman filter 1304. In some cases, determining the initial totem pose from the measured EM field matrix 1322 may result in an ambiguity regarding the direction in which the totem 606 is pointing (e.g., which hemisphere it is pointing toward). In some implementations, to resolve this ambiguity, two threads for the fusion system 1300 are started in parallel, with each thread assuming the totem 606 is pointing in one of the hemispheres. One of the threads will have the correct hemisphere, and one of the threads will have the incorrect hemisphere. As the sensor fusion system 1300 runs, the thread that assumed the incorrect hemisphere can readily be determined, because the pose estimated by this thread will start to diverge more and more from the true totem pose. At that point, this thread can be terminated, and the sensor fusion system 1300 proceeds with just the one thread that assumed the correct hemisphere for the initial totem pose. This technique advantageously identifies the correct hemisphere quickly and is not very computationally demanding in practice.

Error Detection

The totem 606 is typically held in the user's hand, and therefore the distance between the totem 606 and the AR headset 58 typically does not exceed approximately the length of the user's arm. Some embodiments of the sensor fusion system 1300 implement an error protocol that checks whether the estimated distance between the totem 606 and the AR headset 58 exceeds a threshold distance (e.g., comparable to a typical human arm length). For example, the TX→RX Resolver block 1348 can calculate the distance between the EM sensor 604 (typically disposed in the AR headset 58) and the EM emitter 602 (typically disposed in the totem 606) and if the distance exceeds the threshold distance, the fusion system 1300 can determine that an error has likely occurred. If an error is detected, the fusion system 1300 can take corrective actions such as, for example, re-initializing the system.

Example Method for Calculating Pose of a User Input Device

Figure 14:
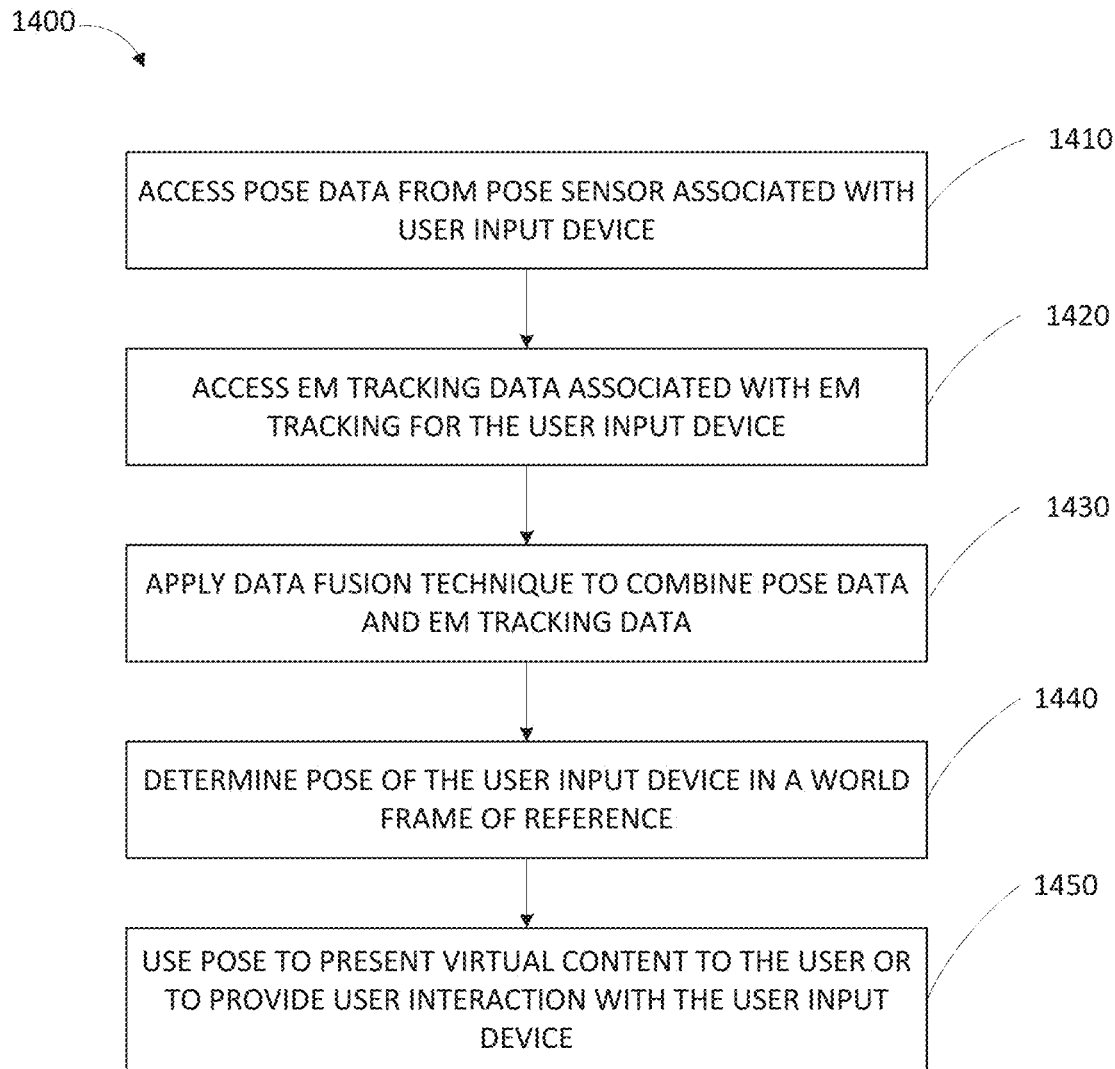
FIG. 14 is a flowchart illustrating an example of a method for calculating a pose of a handheld user input device for a wearable system.

FIG. 14 is a flowchart illustrating an example of a method 1400 for calculating a pose of a handheld user input device/controller/totem 606 for a wearable system 200. The method 1400 may be performed by the INS 1302 described with reference to FIGS. 13A-13C.

At block 1410, the method 1400 accesses pose data from a pose sensor associated with the handheld user input device 606. The pose sensor may include an IMU, an accelerometer, a gyroscope, a magnetometer, an optical sensor, or a combination thereof. At block 1420, the method 1400 accesses EM tracking data associated with an EM tracking system 600 associated with the handheld user input device 606. The EM tracking data may include the EM field matrix, F, described with reference to Equation (1).

At block 1430, the method 1400 applies a data fusion technique to combine the pose data and the EM tracking data. The data fusion technique may include a Kalman filter (or any variety of Kalman filter such as, e.g., an extended or unscented Kalman filter), a Markov model, a Bayesian estimator, linear quadratic estimation, a neural network, a machine learning algorithm, etc. The data fusion technique may calculate error states to correct for bias, noise, nonlinearity, errors, etc. of the pose data output from the pose sensor.

At block 1440, the method 1400 determines a pose of the handheld user input device 606 in a world reference frame associated with an environment of the AR system 200. An example of a world reference frame is the world coordinate system 10 described with reference to FIG. 8. The pose can be a 6DOF pose or a 3DOF pose.

At block 1450, the pose may be used to present virtual content to the user of the wearable system 200 or to provide convenient user interaction with the handheld user input device. For example, as described with reference to FIGS. 10 and 11, the combination of the head mounted display 58 assisting in determining pose relative to the world coordinate system, and the handheld user input device 606 assisting in determining relative location and orientation of the handheld user input device 606 relative to the head mounted display 58, can allow the system 200 to generally determine where each component is relative to the world reference frame, and thus the user's head pose, and handheld pose may be tracked, preferably at relatively low latency, for presentation of augmented reality image features and interaction using movements and rotations of the handheld component. Thus, embodiments of the method 1400 can provide low latency performance and an improved user experience for users of the wearable device 200.

Additional Considerations

Although certain embodiments of the sensor fusion technology are described in the context of real-time pose determination for components of a wearable display system (e.g., IMU and EM sensors for tracking head pose or body pose in an AR or VR context), this is for illustration and not limitation. Embodiments of the sensor fusion technology can be used in other applications and with other devices and in general can be applied to any pose determination system. For example, the sensor fusion technology can be used in a medical or surgical environment and thereby provide an improved position or orientation of medical instruments used during a medical or surgical procedure.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently, mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. Further, pose estimation using EM tracking typically needs to be done in real time in an AR or VR environment, and hardware processing is required to perform the pose estimation task to provide an enjoyable user experience.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The invention includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system comprising:
   a head-mounted display;
   a handheld totem;
   an electromagnetic (EM) tracking system configured to:
      determine, based at least on an EM field sensed by the EM tracking system:
         a first estimated initial totem pose; and
         a second estimated initial totem pose having an opposite orientation from the first estimated initial totem pose;
      periodically determine, based at least on a current EM field sensed by the EM tracking system, a first error state associated with the first estimated initial totem pose and a second error state associated with the second estimated initial totem pose; and
      in response to determining that the first error state exceeds a threshold, establish the second estimated initial totem pose as an initial totem pose of the handheld totem and disregard the first estimated initial totem pose; or
      in response to determining that the second error state exceeds the threshold, establish the first estimated initial totem pose as the initial totem pose of the handheld totem and disregard the second estimated initial totem pose.

2. The wearable system of claim 1, wherein the EM tracking system is further configured to:
   determine a distance between the head-mounted display and the handheld totem; and
   identifying a third error state in response to determining that the distance is larger than a threshold distance.

3. The wearable system of claim 1, wherein the first and second estimated initial totem poses are calculated by a Kalman filter.

4. The wearable system of claim 1, wherein the first estimated initial totem pose is in a first hemisphere and the second estimated initial totem pose is in a second hemisphere opposite the first hemisphere.

5. The wearable system of any claim 1, wherein the EM tracking system is further configured to:
   present, via the head-mounted display, virtual content to a user of the wearable system; or
   enable interaction with an environment of the wearable system based at least partly on movement or rotation of the handheld totem.

6. The wearable system of any claim 1, wherein the EM tracking system comprising:
   one or more EM emitter configured to generate an EM field; and one or more EM sensors configured to sense the EM field, wherein the EM tracking system is configured to output an EM field matrix associated with an estimated totem pose of the one or more EM sensors relative to the one or more EM emitter.

7. A computerized method, performed by a computing system having one or more hardware computer processors and one or more non-transitory computer readable storage device storing software instructions executable by the computing system to perform the computerized method comprising:
   determining, based at least on an electromagnetic (EM) field sensed by an electromagnetic (EM) tracking system:
      a first estimated initial totem pose; and
      a second estimated initial totem pose having an opposite orientation from the first estimated initial totem pose;
   periodically determining, based at least on a current EM field sensed by the EM tracking system, a first error state associated with the first estimated initial totem pose and a second error state associated with the second estimated initial totem pose; and
   in response to determining that the first error state exceeds a threshold, establishing the second estimated initial totem pose as an initial totem pose of the handheld totem and disregarding the first estimated initial totem pose; or
   in response to determining that the second error state exceeds the threshold, establishing the first estimated initial totem pose as the initial totem pose of the handheld totem and disregarding the second estimated initial totem pose.

8. The computerized method of claim 7, wherein the first and second estimated initial totem poses are calculated by a Kalman filter.

9. The computerized method of claim 7, wherein the first estimated initial totem pose is in a first hemisphere and the second estimated initial totem pose is in a second hemisphere opposite the first hemisphere.

* * * * *